(12) United States Patent
Kondo et al.

(10) Patent No.: US 7,136,137 B2
(45) Date of Patent: Nov. 14, 2006

(54) LIQUID CRYSTAL PANEL DEVICE HAVING A COOLING MEDIUM WITHIN GROOVES WHICH ARE FORMED VERTICALLY/HORIZONTALLY ALONG THE HEAT INTERRUPTION LAYER

(75) Inventors: Yoshihiro Kondo, Tsuchiura (JP); Nariaki Shigyo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 167 days.

(21) Appl. No.: 10/902,131

(22) Filed: Jul. 30, 2004

(65) Prior Publication Data

US 2005/0046781 A1 Mar. 3, 2005

(30) Foreign Application Priority Data

Aug. 25, 2003 (JP) ............................. 2003-300165

(51) Int. Cl.
*G02F 1/1333* (2006.01)
(52) U.S. Cl. ..................... 349/161; 349/160; 349/158
(58) Field of Classification Search ................. 349/161
See application file for complete search history.

(56) References Cited

U.S. PATENT DOCUMENTS

| | | | |
|---|---|---|---|
| 6,618,112 B1 * | 9/2003 | Yoshimura et al. | 349/155 |
| 6,989,874 B1 * | 1/2006 | Chae | 349/95 |
| 2003/0098944 A1 * | 5/2003 | Numata et al. | 349/161 |

FOREIGN PATENT DOCUMENTS

| | | |
|---|---|---|
| JP | 05-107519 | 4/1993 |
| JP | 05-264947 | 10/1993 |
| JP | 07-248480 | 9/1995 |
| JP | 11-202411 | 7/1999 |

\* cited by examiner

*Primary Examiner*—Andrew Schechter
*Assistant Examiner*—Lucy Chien
(74) *Attorney, Agent, or Firm*—Antonelli, Terry, Stout and Kraus, LLP.

(57) ABSTRACT

A liquid crystal panel device, being able to transfer heat generation within each of cells building up a panel, into an outside thereof, effectively, therefore being suitable for use in a liquid crystal projection, etc., comprises: a TFT substrate 30, which is formed with semiconductor portions 24 and pattern layers 28 in large numbers on the surface thereof; an opposed substrate 29; and a liquid crystal layer 27 hermetically enclosed between them, wherein heat interruption layers 31 are formed on a surface of the opposed substrate, in opposite to the liquid crystal layer, at the same positions to those of the semiconductor portions, which are formed on the FTF substrate 30, and further comprises an anti-dust glass plate 23 disposed at the light-inlet side thereof, so as to define a space, including a gap 11 and grooves 32, for receiving a cooling liquid 11 therein, on the opposite side surface of the opposed substrate, in vicinity of the heat interruption layers, thereby achieving cooling, effectively, so as to obtain the liquid crystal panel device being long in the lifetime and high in reliability thereof.

16 Claims, 18 Drawing Sheets

(a)

(b)

LIQUID CRYSTAL PANEL DEVICE HAVING A COOLING MEDIUM WITHIN GROOVES WHICH ARE FORMED VERTICALLY/HORIZONTALLY ALONG THE HEAT INTERRUPTION LAYER

BACKGROUND OF THE INVENTION

The present invention relates to a cooling structure of a liquid crystal panel device, in particular, to the cooling structure of the liquid crystal panel device for use in a liquid crystal projector or the like, accompanying heat generation within an inside thereof, and it further relates to an apparatus, into which such the liquid crystal panel is applied.

In various kinds of apparatuses, each of which applies the liquid crystal panel therein, and in particular, in the liquid crystal panel, which is applied into the liquid crystal projector, etc., for example, since it intercepts and/or absorbs the light from a light source, the liquid crystal panel generates heat within an inside thereof; therefore, there is pointed out a problem that it shorten the lifetime of the liquid crystal therein. For this reason, conventionally, a cooling device is provided for the purpose of protecting the liquid crystal panel from such the heat generation. As such the cooling structure for the liquid crystal panel, in particular, applying therein a cooling method of being superior in cooling efficiency, there is already known the structure of sticking a cooling liquid container onto the liquid crystal panel, in which a cooling liquid is hermetically filled up with, as is shown in the following Patent Document 1. And, as is shown in the following Patent Document 2, there is also already known the structure of sticking a cooling liquid container, being transparent and sheet-like, between the liquid crystal device and a polarizing plate located at an inlet side or an outlet side.

Patent Document 1: Japanese Patent Laying-Open No. Hei 5-107519 (1993); and

Patent Document 2: Japanese Patent Laying-Open No. Hei 7-248480 (1995).

Also, as other cooling structure than those, as is shown in the following Patent Document 3, for example, there is also known the structure, in which a liquid crystal panel unit is stuck up between two (2) sets of hermetically sealed containers, each of which is built up with two (2) pieces of transparent glass plates and hermetically filled up with a cooling liquid within an inside thereof.

Patent Document 3: Japanese Patent Laying-Open No. Hei 11-202411 (1999).

Moreover, as is shown in the following Patent Document 4, there is already known a liquid crystal projector having the cooling structure, in which the transparent sealed containers are disposed, respectively, being stuck on the liquid crystal panels, in particular, on the light source side thereof, building up a plural number of liquid crystal bulbs in a projector apparatus, wherein a liquid is circulated within an inside thereof, so as to absorb the heat generated in the liquid crystal panel therein, thereby discharging the heat through a heat exchanger provided in an outside of the liquid crystal panel.

Patent Document 4: Japanese Patent Laying-Open No. Hei 5-264947 (1993).

However, with such the conventional arts as was mentioned above, they capture the heat generation within the liquid crystal panel device, from a macro viewpoint thereof, i.e., the liquid crystal panel is considered to be only a heat generation body. Namely, with such the conventional arts mentioned above, the consideration was not paid sufficiently on the mechanism of generating the heat within a portion of the liquid crystal panel in the liquid crystal projector, etc., for example, and for this reason it is not sufficient for achieving the cooling of the liquid crystal panel device at high efficiency.

BRIEF SUMMARY OF THE INVENTION

Then, according to the present invention, by paying the consideration onto the problems mentioned above in relation to the conventional art; i.e., while capturing the position and the mechanism of the heat generation within the liquid crystal panel in a micro manner, conducting the cooling on that position in that instance; thus, it is an object to provide a liquid crystal panel device having high reliability due to enabling the cooling at high efficiency, and further to provide an apparatus being superior in the heat resisting property while using such the liquid crystal panel(s) therein.

For accomplishing such the object as was mentioned above, according to the present invention, first there is provided a liquid crystal panel device, comprising: a substrate formed with semiconductor portions and pattern layers in plural numbers on a surface thereof; an opposed substrate disposed in opposite to said substrate upon a surface thereof, on which the semiconductor portions and the pattern layers are formed; and a layer of liquid crystal enclosed between said substrate and said opposed substrate, whereby forming liquid crystal cells in plural number within an inside thereof, further comprising: a heat interruption layer being formed on a surface of said opposed substrate in opposite to said liquid crystal layer, corresponding to the semiconductor portions formed on said substrate; a transparent plate being provided in opposite to said opposed substrate, at an upstream side of an optical path of an incident light upon said device; and further a space for receiving a cooling medium within an inside thereof, upon a surface of said opposed substrate, being opposite to the side on which said heat interruption layer is formed, and in vicinity of said heat interruption layer.

And, according to the present invention, in the liquid crystal panel device as described in the above, said cooling medium is a liquid, or a mixture of liquid and gas in phases thereof, or said cooling medium is hermetically enclosed within said receiving space, or guided from said receiving space into an outside of said device. Also, in particular, in the case where the cooing medium is a mixture of liquid and gas in phases, it is preferable that hydrophilic process is treated on a surface of a portion near to said heat interruption layer, within said space for receiving the cooling medium therein, while water-repellent process is treated on remaining portions thereof.

Further, it is preferable that said cooling medium is received within an inside of the gap defined between said opposed substrate and said transparent plate provided in opposite thereto, at the upstream side of the optical path of the incident light, or that said cooling medium is received within grooves formed on a surface of said opposed substrate, facing to said transparent plate disposed in opposite thereto, at the upstream side of the optical path of the incident light. Furthermore, it is preferable that said grooves are formed vertically or/and horizontally along with said heat interruption layers, on the surface of said opposed substrate.

Further, according to the present invention, in the liquid crystal panel device as described in the above, it is desirable that said substrate, said opposed substrate, said liquid crystal layer hermetically enclosed between said substrate and said opposed substrate, and said transparent plate are covered with a frame on an outer periphery thereof, and a groove is formed in an inside of at least a upper side of said frame, connecting with said space, and in addition thereto, an opening portion may be formed in a part of said frame, within which the groove is formed, for the cooling medium to flow within, or a heat radiation fin(s) is/are formed in a part of said frame within which the groove may be formed.

And, according to the present invention, in the liquid crystal panel device as described in the above, further thermo-electric elements are formed on the surface of said opposed substrate, on which said heat interruption layer is formed, and further said thermo-electric elements are disposed along with said heat interruption layers.

Moreover, according to the present invention, also for accomplishing the object mentioned above, there is provided the liquid crystal panel device, being applied as a liquid crystal panel for use in a liquid crystal projector. In such the case, it is preferable that polarizing plates are attached on both a front surface and a rear of said device, respectively.

Also, according to the present invention, there are provide the liquid crystal panel device, being applied as a display for use in a personal computer, or being applied as a display for use in a television apparatus.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Figure 1:
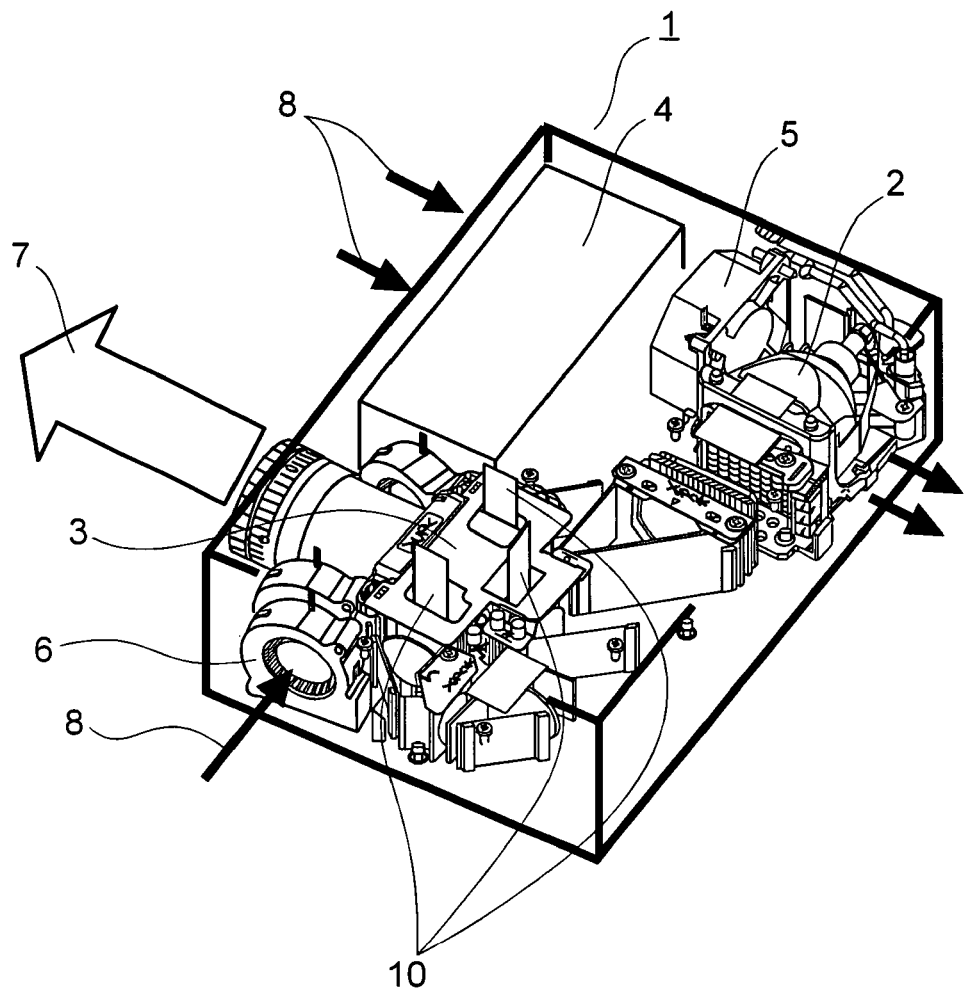
FIG. 1 is a perspective view for showing the internal structure of a liquid crystal projector, into which a liquid crystal panels according to the present invention is applied.

Hereinafter, explanation will be made fully about various embodiments according to the present invention, by referring to the drawings attached herewith.

First of all, FIG. 1 shows a liquid crystal projector, into which is applied the liquid crystal panel device according to the present invention, as an example of the apparatus of applying such the liquid crystal device therein, for example. In this figure, the liquid crystal projector 1 has a lamp 2 as a light source thereof, wherein a light emitted from that lamp is guided into a panel portion 3, which is built up with three (3) pieces of liquid crystal panel devices 10, so as to be converted into color lights of red (R), green (G) and blue (B), through a prism or a mirror, for example. Thereafter, the light is projected through a projector lens, for example, onto a screen or the like, as shown by an arrow 7 in the figure.

Also, within an inside of the liquid crystal projector are further provided an electric power source portion 4 for supplying electricity to each of elements of the apparatus, and a fan 5 for removing heat generated in a portion of the lamp 2 mentioned above. Also, in particular, on the panel portion 3 mentioned above is provided a fan 6 for use of heat radiation. Although those fans mentioned above should be selected, appropriately, among various kinds of fans, including a silocco fan, a propeller fan and so on, for example; however, in particular, in the example shown in this FIG. 1, there is shown an example where the silocco-type is applied as the fan 5 mentioned above, while the propeller-type is as the fan 6 for use of the heat radiation of the panel portion 3 mentioned above.

Further, a cooling air sucked into the apparatus from a side surface thereof, through the fan 6 for use of the heat radiation of the panel portion mentioned above, as is indicated by an arrow 8 in the figure, passes through the panel portion 3 mentioned above and hits on a top plate of the housing of the crystal liquid projector 1, and thereafter, it is further discharged into an outside of the apparatus by means of the fan 5, which is provided adjacent to the lamp 2 mentioned above. Also, a cooling air entering into the apparatus from a front surface side of the liquid crystal projector, also shown by two (2) pieces of arrows in the figure, is discharged into the outside thereof, after passing through the electric power source portion 4, the fan 5, and further the lamp 2.

In this manner, in such the liquid crystal projector as was mentioned above, the cooling airs are taken into, from the outside thereof by means of various kinds of fans, for achieving the cooling, for example. A reason for it lies in that, in particular, in the liquid crystal panel portion 3, it brings about the phenomena, such as, color shading and/or color drift or shift, upon the lights projected therethrough, if distribution of temperature or temperature profile is generated within an inside thereof. Therefore, for those liquid crystal panel portions, it is important to keep the temperature profile to be equal or uniform therein.

Figure 2:
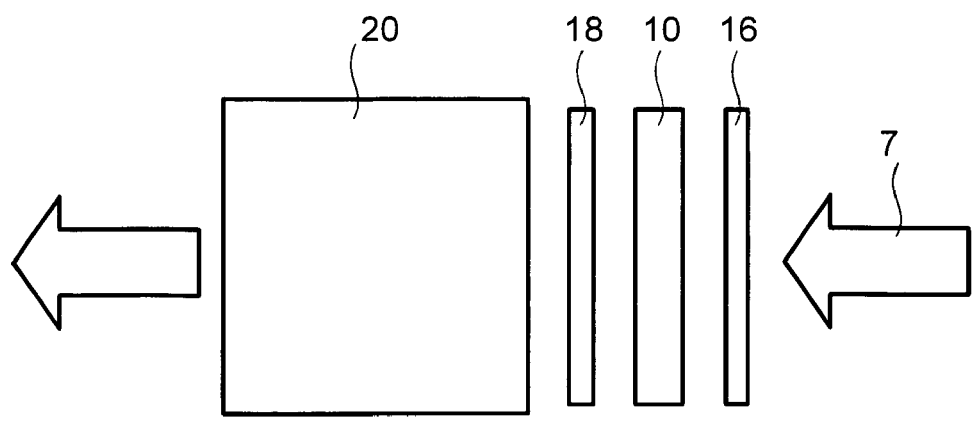
FIG. 2 is a side view for explaining the structure in the vicinity of the liquid crystal panel within the liquid crystal projector mentioned above.

Next, FIG. 2 is a side view for showing the liquid crystal projector, the inner structure of which is shown in FIG. 1 mentioned above, in particular, the liquid crystal panel portion 3 and the constituent elements surrounding thereof. In this figure, the light 7 emitted from the lamp portion 2, after passing through an polarizing plate 16 located at a side, upon which the light is incident (hereinafter, only "light-inlet side" or "inlet side"), a liquid crystal panel 10 and a polarizing plate 18 located at a side, from which the incident light is emitted (hereinafter, only "light-exit side" or "exit-side"), it is condensed through a prism 20, for example, and thereafter it is projected, for example, onto a screen mentioned above. However, the light 7 passing through the polarizing plate 16 at the light-inlet side, the liquid crystal panel 10 and the polarizing plate 18 at the light-exit side, comes to be constant in an angel (i.e., have a polarization angle), and this angle determines the color tone of the picture to be formed thereafter.

Figure 3:
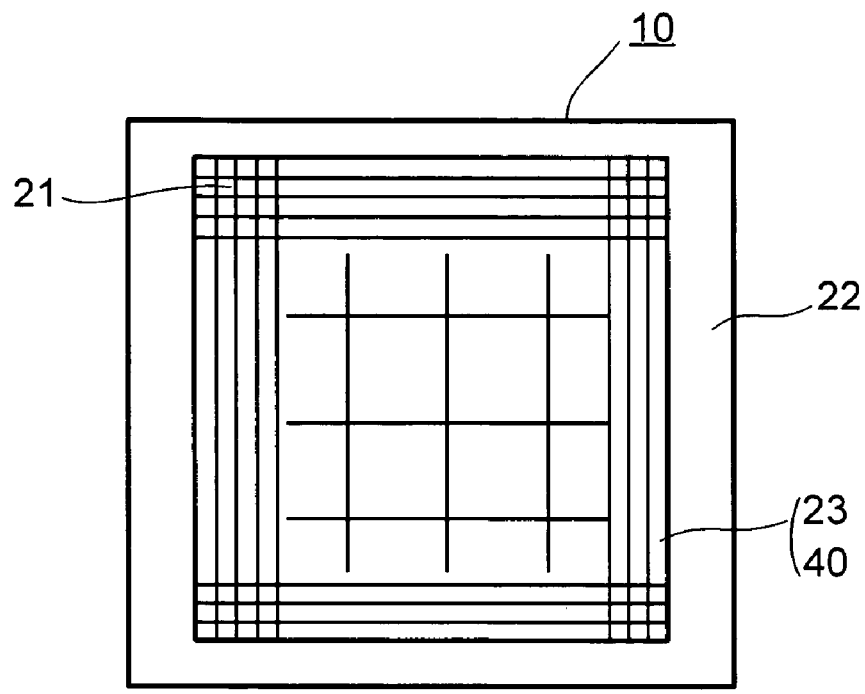
FIG. 3 is a plan view for showing the structure of the liquid crystal panel shown in FIG. 2 mentioned above.

Further, FIG. 3 attached herewith is a plan view for showing the liquid crystal panel 1, seeing from a direction of irradiation of the light thereof. Normally, such the liquid crystal panel 10 of the liquid crystal projector or the like, for example, is built up with a large number cells 21 (i.e., picture elements). For example, that of SVGA method or type includes 480×640 pieces of cells therein. An aggregation of such the large number of cells 21 is enclosed or sealed within an inside of a rectangular attachment frame 22, which will be explained below, being in contact with a dust-proof glass plate 23 at the light inlet side and a dust-proof glass plate 40 at the light exit side, upon both front and rear surfaces thereof.

Figure 4:
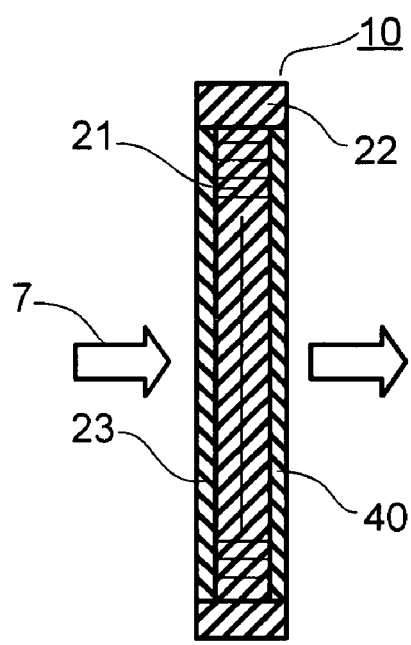
FIG. 4 is a side cross-section view for showing the structure of the liquid crystal panel shown in FIG. 2 mentioned above.

FIG. 4 shows a side surface cross-section view of the liquid crystal panel 10 shown in FIG. 3 mentioned above. The light 7 emitted from the lamp 2, passing through the light inlet side dust-proof glass plate 23 firstly, further the large numbers of cells 21, and then the exit side dust-proof glass plate 40, and it is emitted from the liquid crystal panel 10. However, as was mentioned above, on the liquid crystal panel 10 are disposed and attached the large numbers of cells 21, fixedly, within an inside of the attachment frame 22 thereof.

Next, among the large numbers of cells building up the liquid crystal panel 10 mentioned above, only one (1) piece of the cell 21 is taken out, such as, which builds up the liquid crystal panel 10 shown in FIG. 4 mentioned above, and it is shown in FIG. 5(*a*) attached herewith, in form of the plan view thereof, seeing from the inlet side of the light, and in FIG. 5(*b*) attached herewith in form of the side cross-section view thereof. Further, this one (1) piece of cell 21 has a size, for example, 15 to 20 μm square (⊚), in the outer shape thereof.

Within this one (1) piece of cell 21, as is apparent from those figures, at the outermost portion thereof is provided an opposed plate 29, being transparent and thin in the thickness, which is made of silicon, etc., for example, and on an inner side-surface thereof is formed a heat barrier or interruption film or a layer 31 in an about "<" shape, for the purpose of cutting off the heat and the light from an outside thereof. This heat interruption layer 31 is provided, in particular, in the liquid crystal projector, for protecting a semiconductor portion 24, which holds a liquid crystal layer 27 therebetween, from irradiation of an intensive or strong light emitted from thereupon, for example, the lamp 2 mentioned above. Therefore, this interruption layer 31 is provided at a position corresponding to the semiconductor portion 24, which is formed on a TFT substrate 30. In more details, a region or area, within which this interruption layer 31 is formed, is about the same to that of the semiconductor portion 24, which is formed on the transparent TFT substrate 30.

Figure 5:
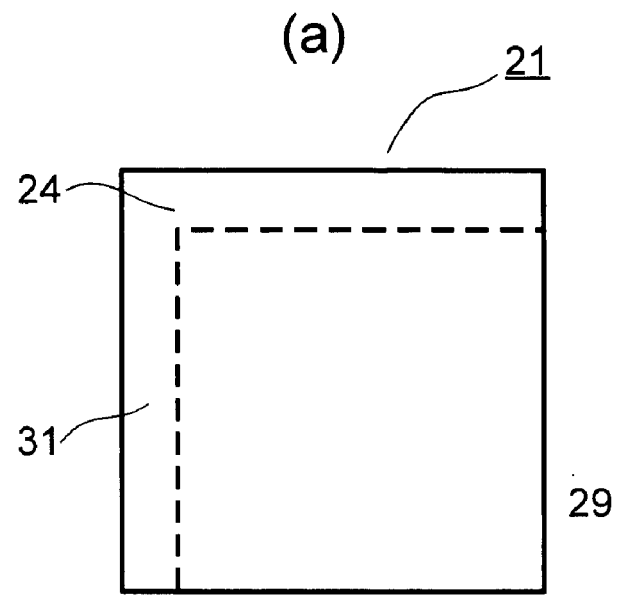
FIGS. 5(a) and 5(b) are a plan view and a side cross-section view for showing the structure of a cell building up the liquid crystal panel shown in FIG. 2 mentioned above.
Figure 5:
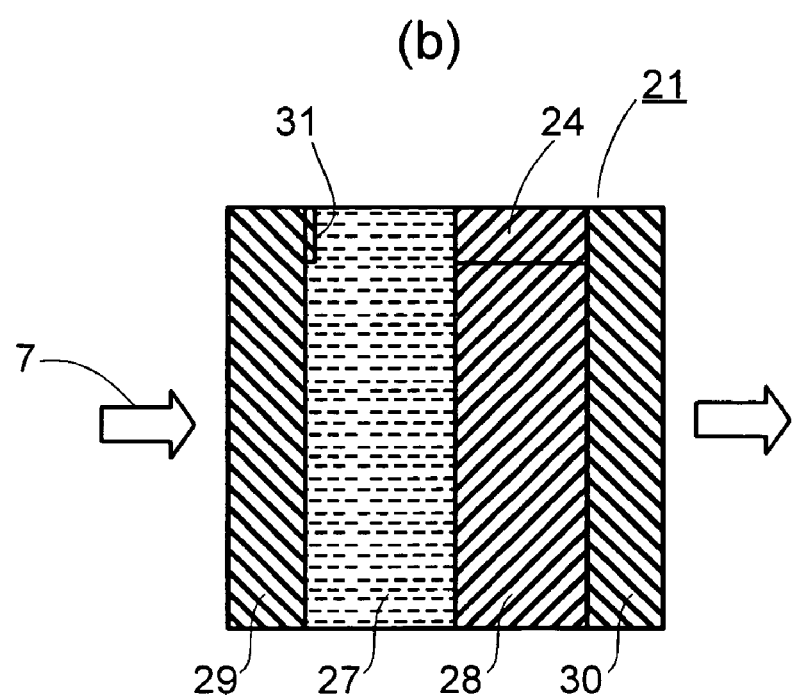

And, as is shown in FIG. 5(*b*), the light from the lamp 2, although being mentioned in the above, is incident upon the opposed substrate 29, and thereafter it reaches to the liquid crystal layer 27. In this instance, however, upon the surface thereof is formed the heat interruption layer 31 mentioned above, with which the opposed substrate 29 and the liquid crystal layer 27 are in contact. Namely, this heat interruption layer 31 carries out the function of preventing the emission light of the lamp from penetrating through into a downstream side thereof. However, in a region or area other than the heat interruption layer 31 mentioned above, the light 7 passing through the liquid crystal layer 27, and then next it reaches to a pattern layer 28, which is formed on the TFT substrate 30 mentioned above. Further, adjacent to this pattern layer 28, there is also provided the semiconductor portion, which is formed in the about "<" shape as was mentioned above; therefore, the angle of the light (i.e., the polarization angle) on the liquid crystal layer 27 is changed or converted by the function of this semiconductor portion 24. Thereafter, the light passing through this pattern layer 28 further goes through the TFT substrate, which is electrically conductive with the semiconductor portion 24 mentioned above.

Figure 6:
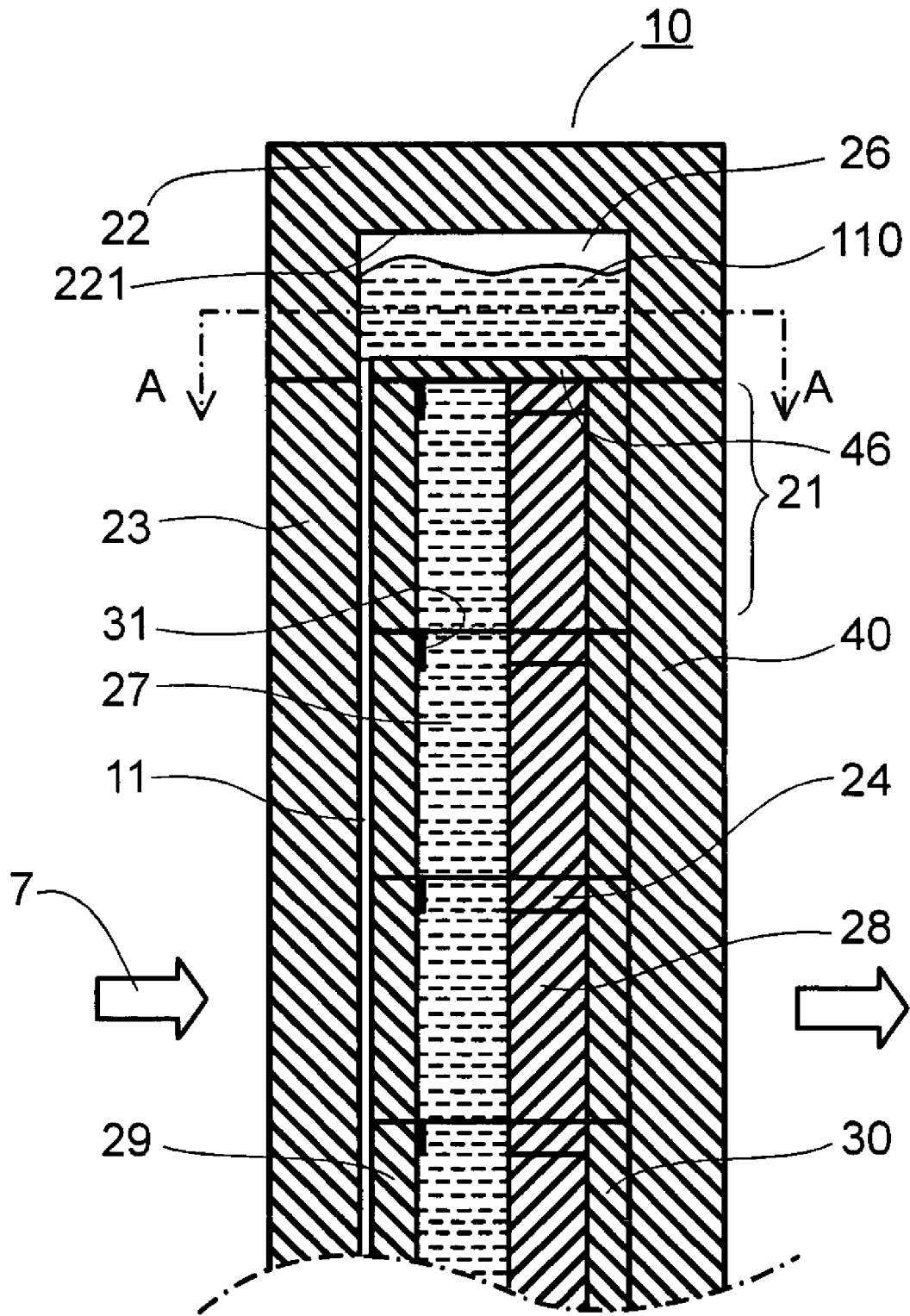
FIG. 6 is a partial enlarged cross-section view for showing the structure of the liquid crystal panel, according to one embodiment of the present invention.

Following to the above, in FIG. 6 attached herewith, there is shown a portion in the liquid crystal panel device 10, according to one embodiment of the present invention; i.e., a portion at a center in the horizontal direction of the liquid crystal panel and in the vicinity of an upper portion thereof, in form of an enlarged cross-section in the vertical direction. In this figure, the aggregation of the large numbers of cells 21 mentioned above is enclosed and sealed within an inside of the attachment frame 22, and the dust-proof glass plate 23 at inlet side and the dust-proof glass plate 40 at exit side. Further, as is apparent from this figure, between the dust-proof glass plate 23 at inlet side and the cell 21 is provided a gap 11 of being about several μm to several hundreds μm in thickness, for example, and in this gap, there is filled up with an cooling liquid 110 of so-called an anti-freezing liquid, such as, ethylene glycol or propylene glycol, or the like, for example. Also, within an inside of the attachment frame 22 surrounding the large number of cells 21 mentioned above, there is also formed a groove 221, and within an inside thereof is also filled up with the cooling liquid 10 of so-called an anti-freezing liquid, such as, ethylene glycol or propylene glycol, or the like, for example. Further, a reference numeral 26 in the figure depicts an air layer formed in an upper portion of the cooling liquid within the groove 221 mentioned above. Namely, the cooling liquid 110 filled up within the gap 11, which is defined between the above-mentioned dust-proof glass plate 23 and the cell 21 and within the groove 221 mentioned above can move and circulate, freely, within the inside thereof.

And, with such the structure of the liquid crystal panel device 10 mentioned above, almost of the light 7 emitted from the lamp passes through the dust-proof glass plate 23 at inlet side, first, and following thereto, it passes through the layer of the cooling liquid filled up within the inside of the gap 11, the opposed substrate 29 building up the cell 21, the liquid crystal layer 27, the pattern layer 28, and then the TFT substrate 30, sequentially. And, further after passing through the dust-proof glass plate 40 at exit side, the light is emitted into the outside thereof. Herein, a reference numeral 46 is a sealing resin, which is applied and hardened on an outer end-surface thereof, for the purpose of fixing the opposed substrate 29 and the TFT substrate 30 into one body while enclosing and sealing the liquid crystal layer 27 between them.

By the way, as was explained by referring to FIG. 5(*b*) mentioned above, for the purpose of preventing the light 7 of an outside from irradiating upon the semiconductor portion 24 within the pattern layer 28, the heat interruption layer 31 mentioned above is provided at the upstream side of the liquid crystal layer 27 on an optical path of that light, in more details, on the contact surface between the opposed substrate 29 and the liquid crystal layer 27. For this reason, the intensive light 7 from the lamp is cut off upon the heat interruption layer 31, and is changed or converted into heat thereon. With this, the above-mentioned cell 21 generates the heat therein, and in particular, the temperature of the liquid crystal layer 27 goes up. Also, in the liquid crystal panel, which is applied into the liquid crystal projection mentioned above, the light trying to penetrate through the liquid crystal layer is absorbed therein, depending upon the color tone thereof (in particular, in a case of displaying a black color therein); therefore, the temperature of the liquid crystal layer 27 goes up.

Then, according to the present invention, for the purpose of eliminating or suppressing a local increase in the temperature of the liquid crystal layer 27, in particular, due to the heat generation on the heat interruption layer 31 mentioned above, a thermal medium is provided adjacent to the heat interruption layer 31. In more details thereof, the gap 11 is formed between the dust-proof glass plate 23 at the light inlet side and the cell 21, for providing a layer of cooling liquid within an inside thereof. Wish such the structure, the heat generated due to the cut-off by means of the heat interruption layer 31 moves, due to the heat conduction, up to the surface of the opposed substrate 29, which builds up the cell 21, and then it is transmitted to the cooling liquid 11 there. On the other hand, the cooling liquid within the gap 11, which rises up the temperature thereof due to this, moves upwards through free or natural convection to an upper portion of the gap 11, which is defined between the dust-proof glass plate 23 and the cell 21, thereby reaching into the groove 221 formed in the attachment frame 22 mentioned above. In this manner, after being transmitted through the cooling liquid 110 filled within the gap 11, the heat is discharged into an outside air through a wall surface of the attachment frame 22 and so on. With such the heat radiating structure according to the present invention, it is possible to protect the liquid crystal panel 10 from the local increase of temperature within the large numbers of cells 21 thereof, and thereby, improving reliability thereof, as well as, elongating the lifetime of the liquid crystal panel.

Figure 7:
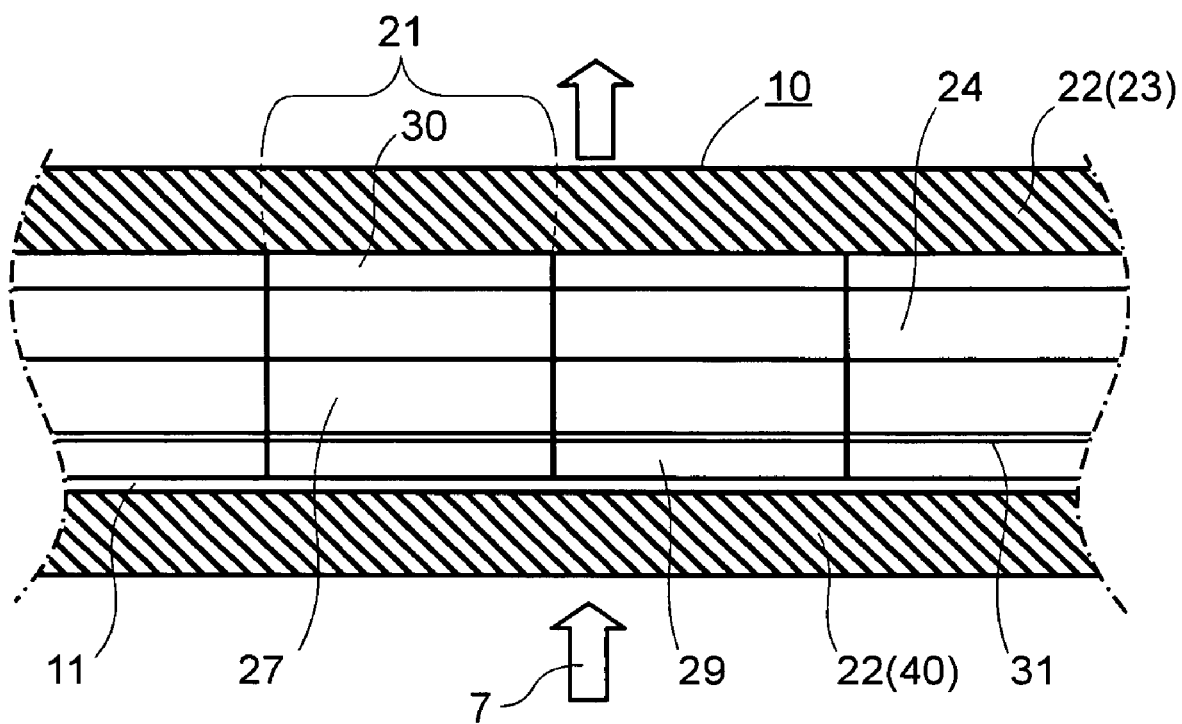
FIG. 7 is an A—A cross-section view in FIG. 6 mentioned above, for showing the structure of the liquid crystal panel, according to the one embodiment of the present invention.

Further, FIG. 7 is a view for showing the A—A cross-section within the liquid crystal panel device shown in FIG. 6 mentioned above. In this FIG. 7, as is indicated by an arrow 7 in the figure, the light irradiated from the lamp mentioned above penetrates through the liquid crystal panel device 10, directing from below to above in the figure, and in this figure, it is clearly indicated that the cells 21 are aggregated, not only the vertical direction, but also in the horizontal direction.

Figure 8:
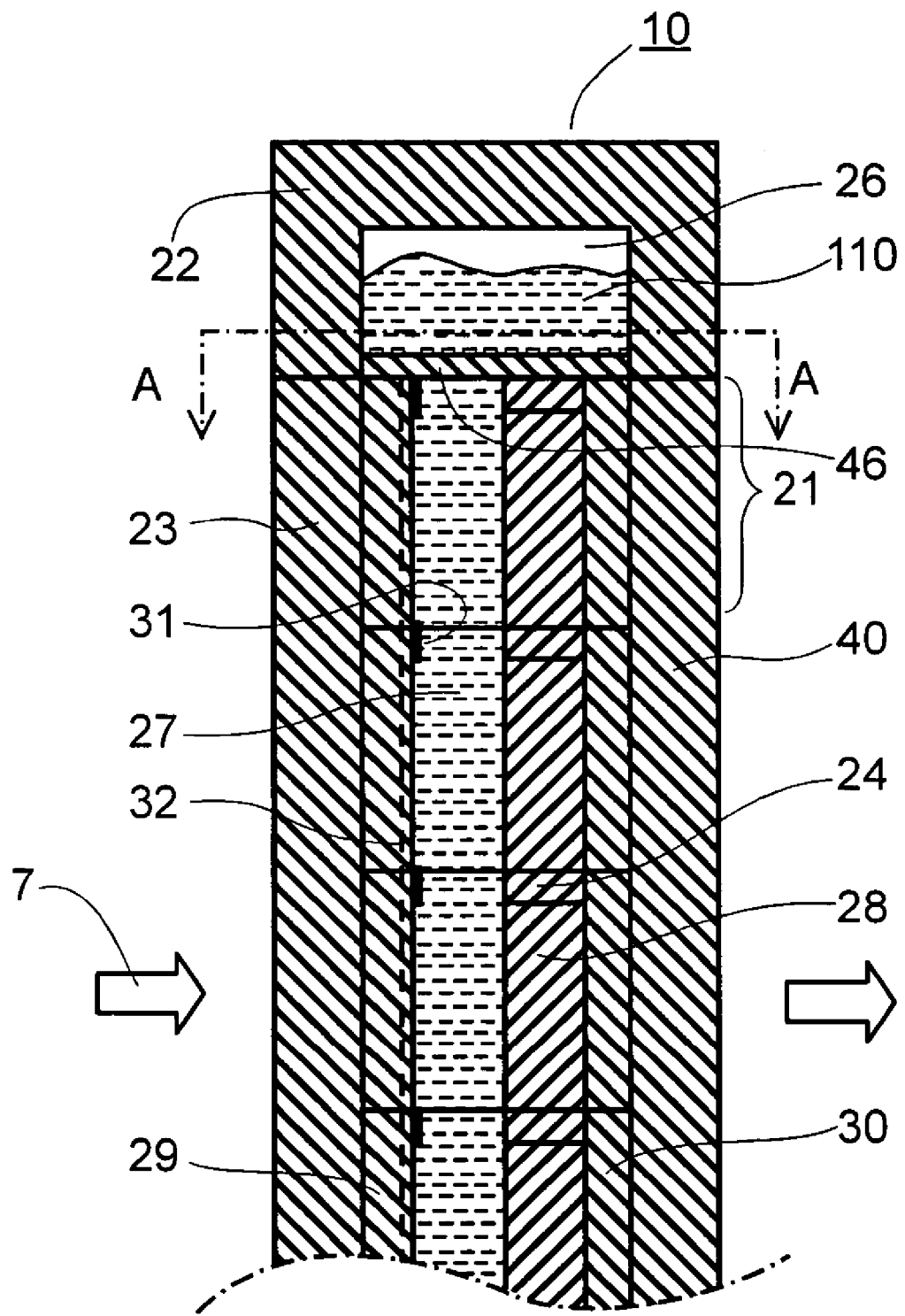
FIG. 8 is a partial enlarged cross-section view for showing the structure of a variation of the liquid crystal panel, according the present invention.
Figure 9:
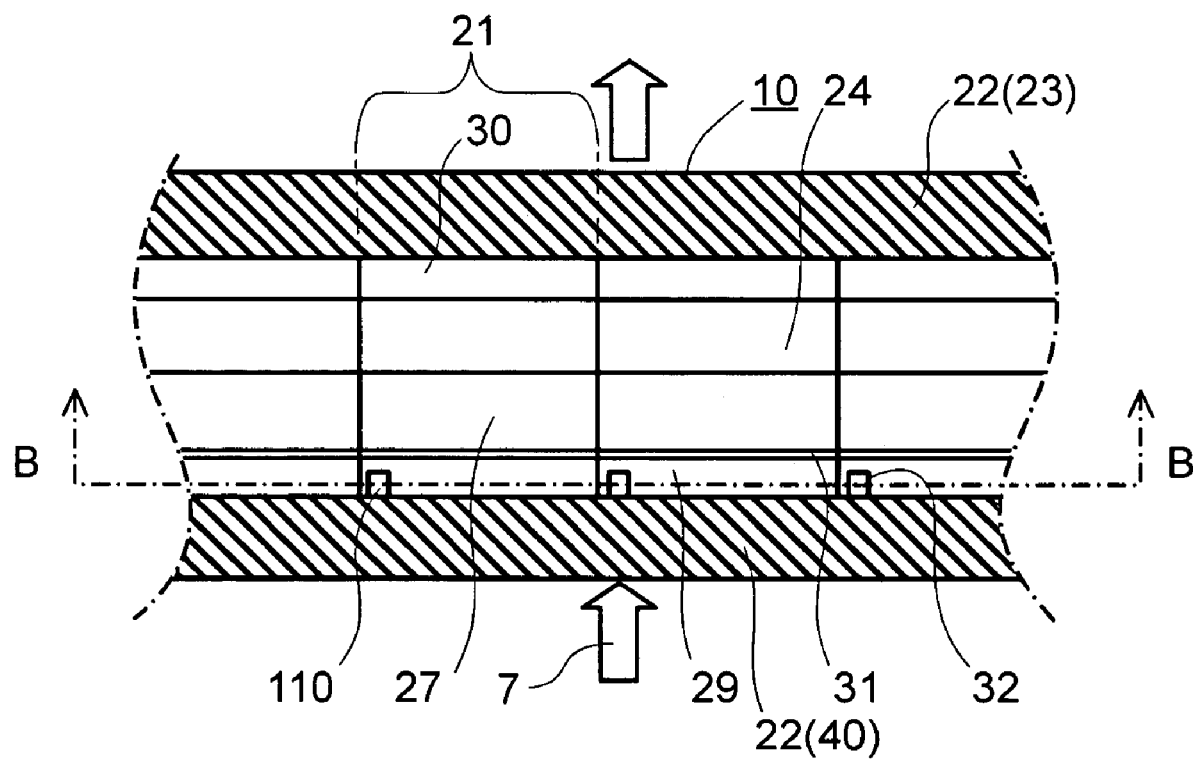
FIG. 9 is an A—A cross-section view in FIG. 8 mentioned above, for showing the structure of the variation of the liquid crystal panel, according to the present invention.

Next, FIGS. 8 and 9 attached herewith show a variation of the liquid crystal panel device according to the present invention, which was shown in FIGS. 6 and 7 mentioned above. In the similar manner, those figures show the cross-section view and the A—A cross-section view of the liquid crystal panel 10, too, at a center thereof in the horizontal direction, and also in the vicinity of an upper portion in the vertical direction thereof. However, in this variation of the liquid crystal panel device 10, as is apparent from those figures, the aggregation of the large numbers of cells 21 are disposed fixedly within an inside of the attachment frame 22 mentioned above, between the dust-proof glass plate 23 at the inlet side and the dust-proof glass plate 40 at the exit side, while directly contacting with each other on the front side surfaces thereof (i.e., there is no gap defined between the opposed substrate 29 and the dust-proof glass plate 23). And, in this variation, it is same to the above, that the light 7 from the lamp passes through each portion, in the similar manner as was mentioned above, but it is cut off upon the heat interruption layer 31, thereby being changed into heat thereupon.

Then, according to this variation, differing from the structure shown in FIGS. 6 and 7 mentioned above, in particular, as apparent from FIG. 9 mentioned above, on the surface of the opposed substrate 29 building up the each cell, further in more details thereof, upon the surface on the side being in contact with the dust-proof glass plate 23 at the inlet side thereof, there is provided a groove 32 in the vertical direction, which has a width (for example, 2–5 μm) nearly equal to the heat interruption layer 31, in particular, the width of the portion extending in the vertical direction thereof (see the reference numeral 31 in FIG. 5 mentioned above). Further, FIG. 9 mentioned above shows the A—A cross-section in FIG. 8 mentioned above, and there is also shown the direction of propagation of the light by an arrow 7 in the figure. And, as is apparent from the figure, it is also same to the example mentioned above, in that the large numbers of cells 21 are aggregated into both the vertical direction and the horizontal direction.

Figure 10:
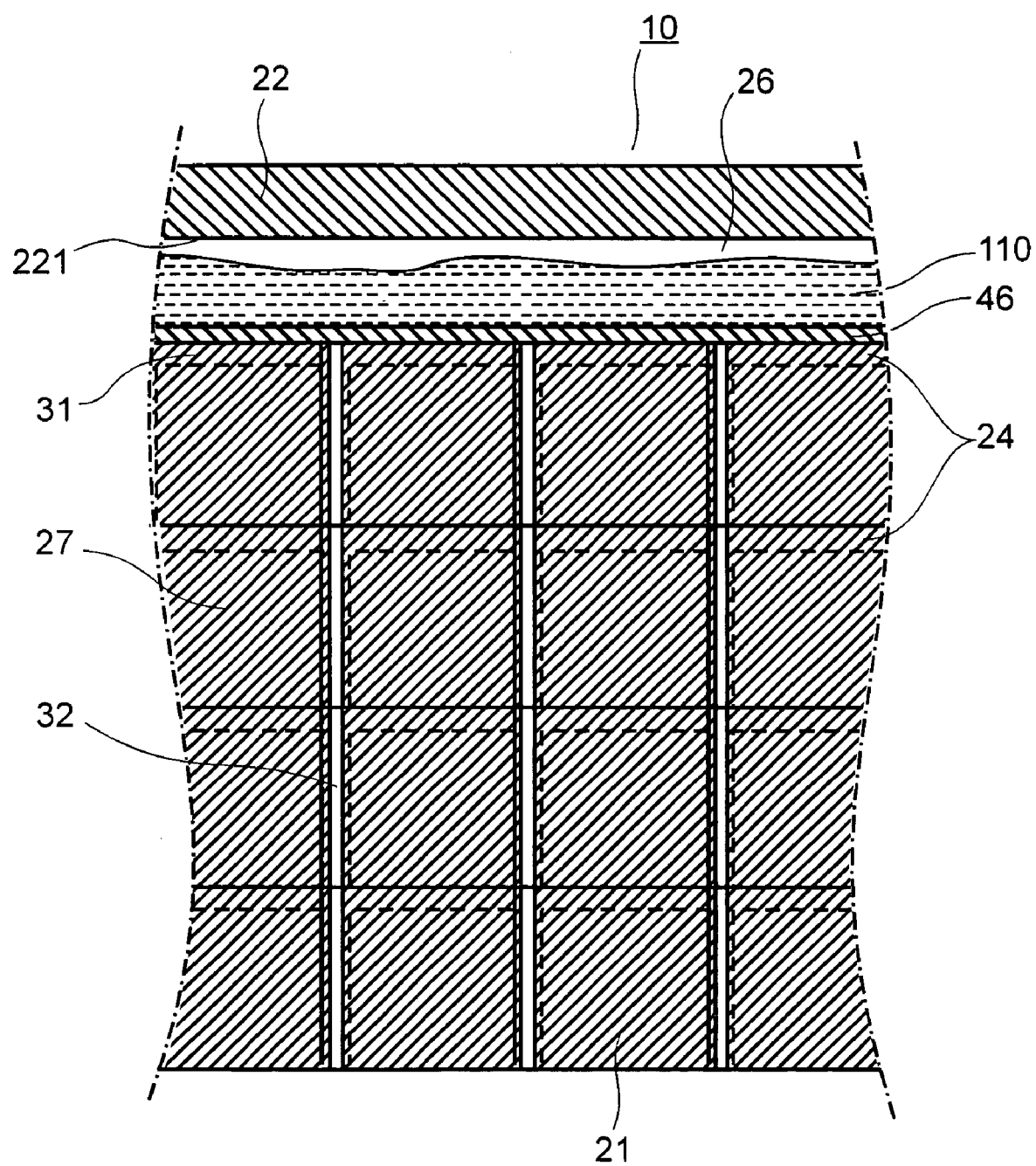
FIG. 10 is a B—B cross-section view in FIG. 9 mentioned above, for showing the structure of the variation of the liquid crystal panel, according to the present invention.

Also, as is apparent from FIG. 10 attached, the groove 32 is formed at a position of the heat interruption layer 31, when seeing it from the direction of incident light 7, and also, within the inside thereof, there is filled up with the cooling liquid 110 including the anti-freezing liquid therein, in the similar manner as was mentioned above. Further, the depth of this groove 32 is, of course, less than thickness of the opposed substrate 29, and in particular, it is preferable to be formed, being equal or greater than a half of the thickness of the opposed substrate 29. In addition thereto, within an inside of the attachment frame 22 mentioned above, there is also formed the groove 221, and it is also same to the mentioned above, that the cooling liquid 110 including the anti-freezing liquid is filled up therein while defining the air layer 26 in the upper portion thereof.

Further, this FIG. 10 shows the B—B cross-section in FIG. 9 mentioned above, and as is apparent from this FIG. 10, the large numbers of cells 21 are aggregated in both the vertical direction and the horizontal direction thereof, and it is also apparent that the semiconductor portion 24 of the each cell is almost the same to the heat interruption layer 31, in particular, in the shape thereof. And, as is also apparent from this FIG. 10, the groove 32 mentioned above is provided, penetrating through the liquid crystal panel 10 in the vertical direction thereof, so as not to prevent the cooling liquid 11 from circulating or moving therein, due to the free or natural convection.

With such the structure as was mentioned above, if the cell 21 generates heat therein, through converting the light 7 cut off upon the heat interruption layer 31 into the heat, and if the temperature goes up of the liquid crystal layer 31 accompanying with this, however, this heat also moves to the surface of the groove 32, which is formed on the surface of the opposite side, through the opposed substrate being in contact with the liquid crystal layer 27, due to the heat conduction, and it is transferred to the cooling liquid therein. On the other hand, the cooling liquid rising up the temperature thereof due to this comes up along the groove 32 due to the free or natural convection thereof, and it moves into the groove 221 formed in the attachment frame 22 mentioned above. Thereafter, this heat is discharged into the outside air through the outer wall and so on of the attachment frame 22. Thus, with such the heat radiating structure according to this variation, too, it is also possible to protect the liquid crystal panel 10 from the local increase of temperature within the large numbers of cells 21 thereof; thereby, improving reliability thereof, as well as, elongating the lifetime of the liquid crystal panel.

Further, with the structure of the liquid crystal panel device 10, according to such the variation as was mentioned above, as is apparent from those figures, in particular, due to the function of the groove 32, which is formed on the surface of the opposed substrate 29, on the opposite side to the surface in contact with the liquid crystal layer 27, a distance can be shorten for the heat to move, and with this, it is possible to guide the heat generated within an inside of the cell into an outside thereof, effectively. For this reason, in this example, comparing to the case where the distance is long for the heat to move, it is possible to bring thermal difference caused within the inside of the cells due to the difference in the heat conductivity, etc., to be small much more.

Figure 11:
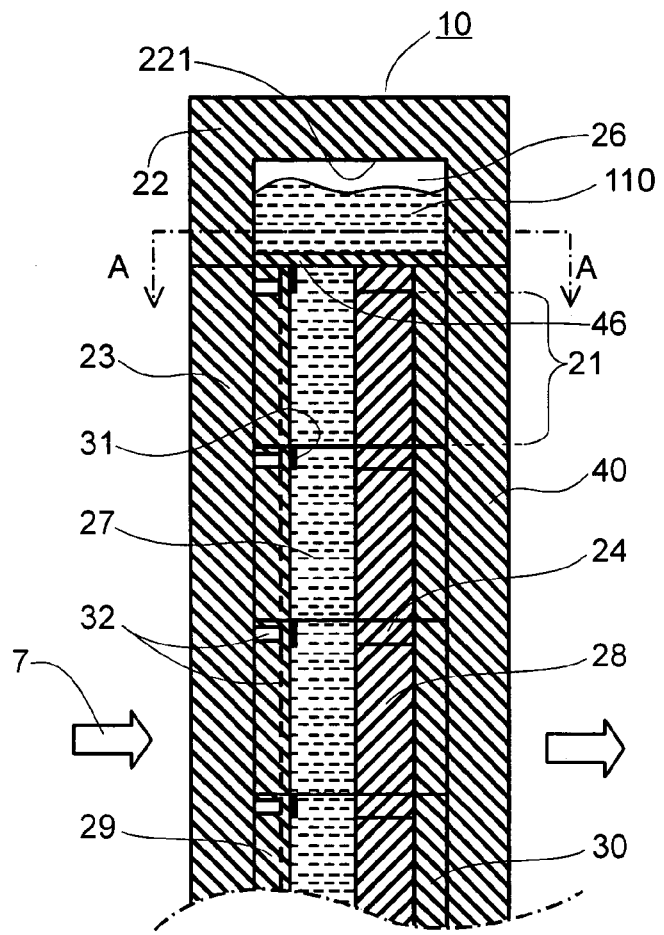
FIG. 11 is a partial enlarged cross-section view for showing the structure of other variation of the liquid crystal panel, according the present invention.
Figure 12:
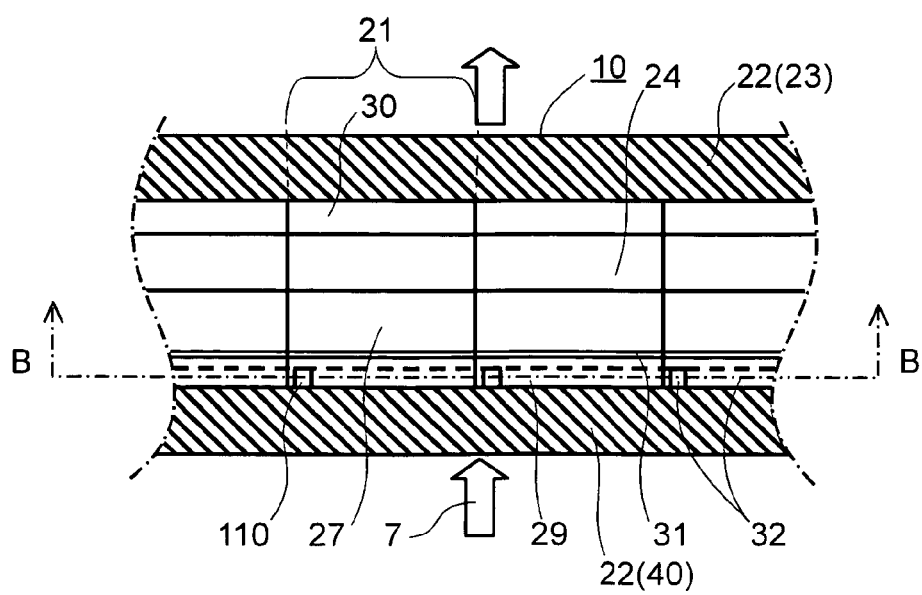
FIG. 12 is an A—A cross-section view in FIG. 11 mentioned above, for showing the structure of other variation of the liquid crystal panel, according to the present invention.
Figure 13:
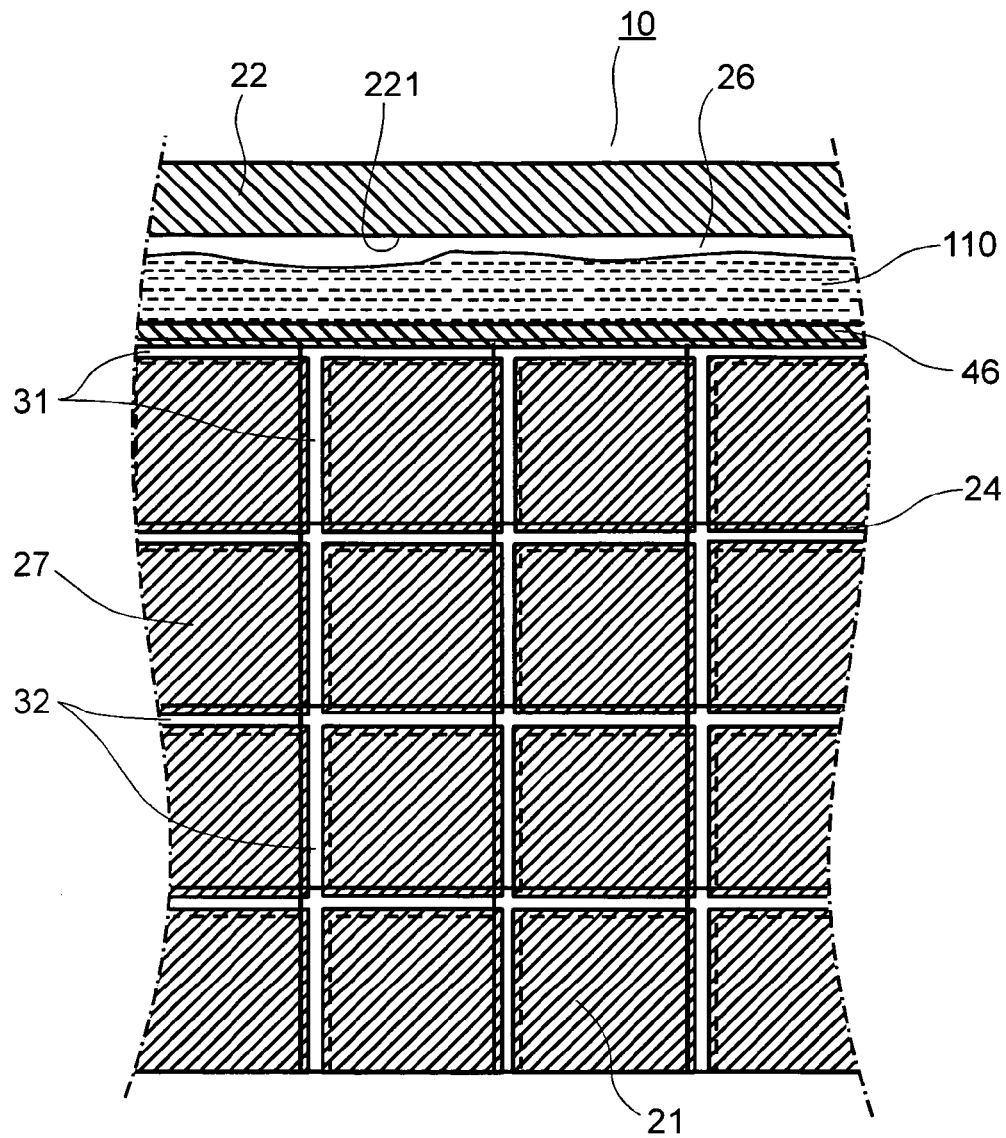
FIG. 13 is a B—B cross-section view in FIG. 12 mentioned above, for showing the structure of other variation of the liquid crystal panel, according to the present invention.

Further, FIGS. 11 to 13 attached herewith shows other variation of the liquid crystal panel device 10 shown in the above, according to the present invention. Also in those figure, FIG. 11 shows the liquid crystal panel 10, at a central portion thereof in the horizontal direction and in the vicinity of an upper portion thereof in the vertical direction, and FIG. 12 shows the cross-section view of the liquid crystal panel 10 on the A—A cross-section shown in FIG. 11 mentioned above. And, FIG. 13 shows the cross-section view of the liquid crystal panel 10 on the B—B cross-section shown in FIG. 12 mentioned above.

Also, in the liquid crystal panel device 10 according to this other variation, as is apparent from the figures mentioned above, the aggregation of large numbers of cells 21 are disposed fixedly, within an inside of the attachment frame 22, between the dust-proof glass plate 23 at the inlet side and the dust-proof glass plate 40 at the exit side, while directly contacting with each other upon the front side surfaces thereof (i.e., there is no gap defined between the opposed substrate 29 and the dust-proof glass plate 23). And, with this variation, it is also same to the above, that although the light 7 emitted from the lamp passes through each portion, in such the similar manner to the case as was mentioned above, but the light is cut off upon the heat interruption layer 31, to be changed or converted into heat, and this results into the heat generation in the cell 21.

Then, in such the similar manner as was mentioned above, on the surface of the opposed substrate 29 building up the cell 21, in more details thereof, upon the surface on the side being in contact with the dust-proof glass plate 23 at the inlet side, there is provided a groove 32 in the vertical direction, which has a width (for example, 2–5 µm) nearly equal to the heat interruption layer 31, in particular, the width of the portion extending in the vertical direction thereof (see the reference numeral 31 in FIG. 5 mentioned above), and further, according to this other variation, the groove 32 is also provided in the horizontal direction, too. Thus, the grooves 32 are provided in both directions, i.e., the vertical direction and the horizontal direction thereof, penetrating through the large numbers of cells 21, which are aggregated in both the horizontal direction and the vertical direction for building up the liquid crystal panel 10, and therefore, the cooling liquid 110 can move and circulate directing into both the vertical direction and the horizontal direction, over the entire surface of the liquid crystal panel 10, due to the free or natural convection thereof.

And with such the structure, it is possible to guide the heat generating along the heat interruption layers 31, which are formed extending, but in actual, not only in the vertical direction, but also in the horizontal direction (i.e., being same in the shape thereof to the semiconductor portion 24 and the heat interruption layer 31, which are built up on the TFT substrate 30), into an outside, by means of the cooling liquid 110 filled up within the grooves 32, which are formed extending in both the vertical direction and the horizontal direction, corresponding to those heat interruption layers 31, with much further certainty, even if comparing to the variation mentioned above.

However, the mechanism of transmitting the heat generated within the liquid crystal panel device 10 into the outside thereof, according to this other variation, it is almost same to that in the variation, which was explained by referring to FIGS. 8 to 10 in the above, but except for that the heat from the cell 21 is also transmitted to the cooling liquid filled up within the groove 32 formed in the horizontal direction. Namely, the heat is transferred to the cooling liquid 110 within the groove 32, and the cooling liquid 110 increasing the temperature thereof moves into the groove 221 formed in the attachment frame 22, due to the free or natural convection. Then, the heat transmitted by this cooling liquid 110 is discharged into the outside air from/through that attachment frame 22. With this heat radiation, it is also same to the mentioned above that it is possible to protect the liquid crystal panel 10 from the local increase of temperature within the cells 21 thereof, and thereby elongating the lifetime of the liquid crystal panel.

Figure 14:
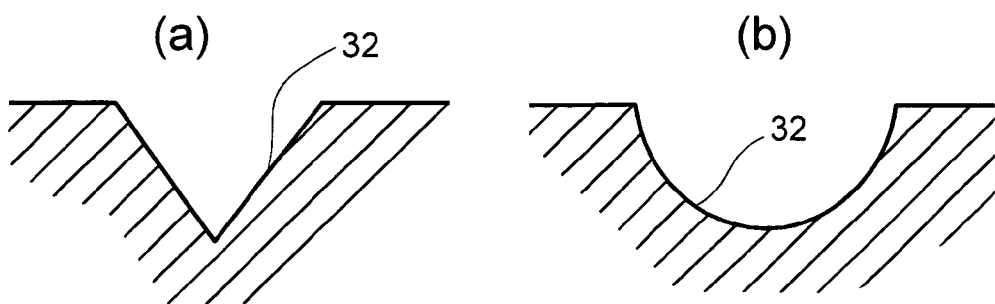
FIGS. 14(a) and 14(b) are a partial enlarged cross-section views for showing variations of a groove in the structure of the liquid crystal panel apparatus mentioned above, according to the present invention.

Also, in the example mentioned above, the groove 32 was explained to be rectangle in shape of the cross-section thereof, which is formed on the surface of the opposed substrate 29, in particular, from a viewpoint of easiness of manufacturing when processing it (in particular, in an etching process), however it should not be restricted only to that shape, but other than that, the groove 32 may be formed into triangle-like or semi-circular in the cross-section shape thereof, as is shown in FIGS. 14(a) and 14(4) attached herewith. In particular, when the groove 32 is formed into the triangle-like or semi-circular in the shape of the cross-section, since scattering on the edge portion comes to be less in the light penetrating therethrough; therefore, it is possible to obtain a superior picture formed by the projection lights penetrating therethrough, i.e., less in the noises.

Further, in the example mentioned above, the heat on the heat interruption 31 generated upon incidence of the light 7 from the outside, and further, also the heat of the liquid crystal layer 27, which increases the temperature thereof due to absorption of the light, are transmitted to the outside of the liquid crystal device 10; therefore, in the vicinity of the heat interruption layer 31, i.e., between the opposed substrate 29 and the dust-proof glass plate 23, there is formed the gap 11 (see FIGS. 6 and 7 mentioned above), or alternatively, on the surface of the opposed substrate 29 contacting with the dust-proof glass plate 23, there are formed the grooves 32 extending in the vertical direction, nearly penetrating through the liquid crystal panel device 10 (see FIGS. 8 through 10 mentioned above), or alternatively, in addition to the above-mentioned grooves extending vertically, there are further formed the grooves 32 extending in the horizontal direction (see FIGS. 11 through 13), and into the inside of the gap 11 made up or the grooves extending vertically or/and horizontally, there is filled up with the cooling liquid, including the anti-freezing liquid therein. However, the present invention should not be limited only to such the structure as was mentioned above, but it may be possible to adopt such the structure, that the grooves 32 extending vertically as shown in FIGS. 8 through 10 are formed, in addition to the gap 11 shown in FIGS. 6 and 7 mentioned above, or that the grooves 32 extending in both the vertical direction and the horizontal direction are formed, so as to be filled up with the cooling liquid 110 within the inside thereof.

Figure 17:
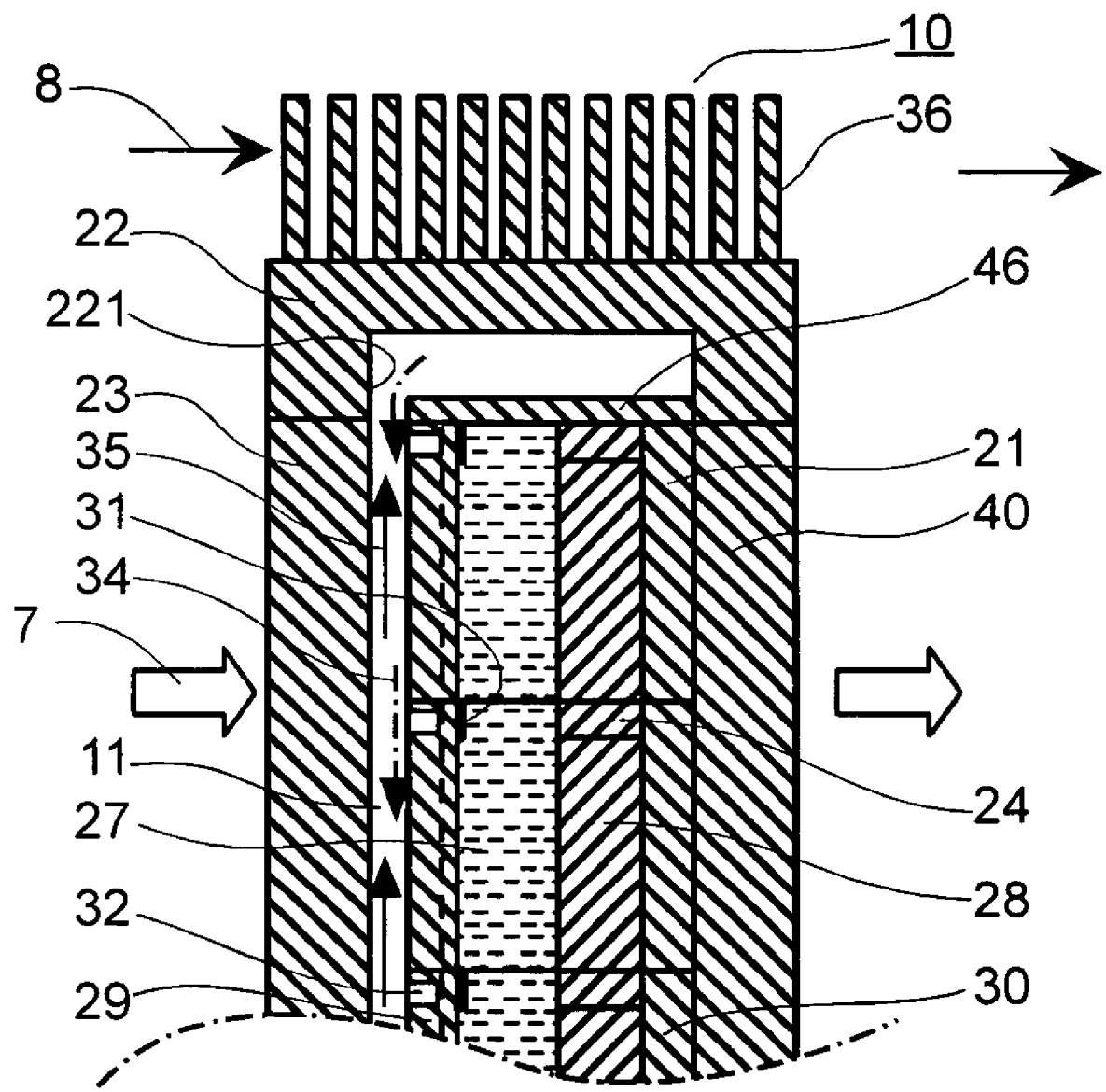
FIG. 17 is a partial enlarged vertical cross-section view for showing the structure of the liquid crystal panel of a second variation, according to other embodiment of the present invention.

In addition thereto, in the example mentioned above, the cooling liquid 110, into which the heat from the cell 21 is transferred, moves into an inside of the grooves 221 formed in the attachment frame 22, due to the free or natural convection, and it discharges the heat into the outside air through the outer wall surface thereof, and further in addition thereto, as is shown in FIG. 17, which will be explained hereinafter, for example; i.e., with provision of heat radiation fins in a part thereof, the heat radiation can be conducted, effectively, directing from the attachment frame 22 forming an outer frame of the liquid crystal panel device into the outside air, and therefore, being preferable.

Next, detailed explanation will be made about the liquid crystal panel 10, according to other embodiment of the present invention, by referring to FIG. 15 attached herewith. However, also in the liquid crystal panel 10 according to this other embodiment, there is provided the heat medium adjacent to the heat interruption layer 31, too, for the purpose of removing the heat generation upon the heat interruption layer 31 within the each cell 21, as well as, escaping or preventing the liquid crystal layer 21 from increasing the temperature thereof; however, differing from the embodiment explained in the above, as the heat medium mentioned above is provided a layer of the cooling liquid, including a liquid phase and a gaseous phase therein, between the dust-proof glass plate 23 at the light inlet side and the cell 21.

Figure 15:
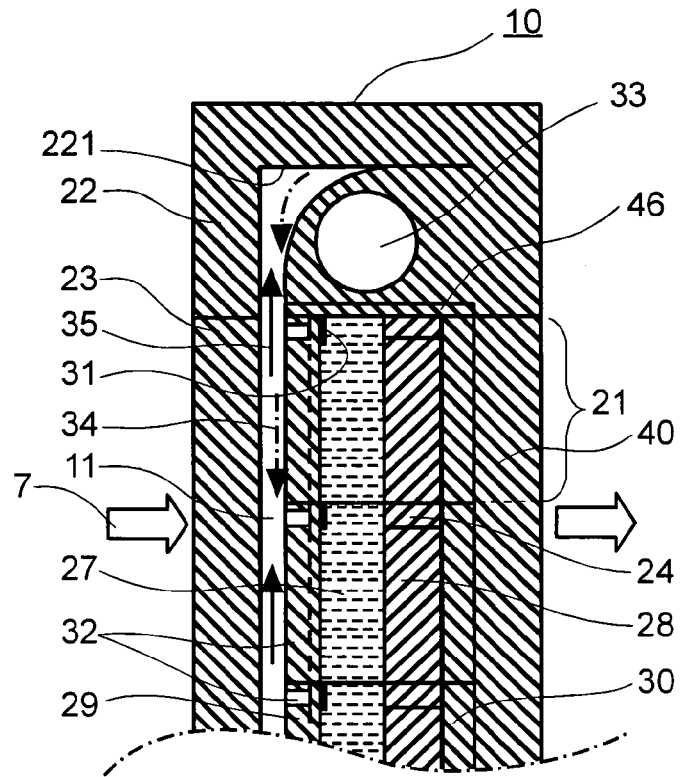
FIG. 15 is a partial enlarged vertical cross-section view for showing the structure of the liquid crystal panel, according to other embodiment of the present invention.

This FIG. 15 shows a portion of the liquid crystal panel 10, according to the other embodiment; thus, enlarging the portion at a center in the horizontal direction and in the vicinity of an upper portion, upon the vertical cross-section thereof. As is apparent from the figure, in the liquid crystal panel 10 according to the other embodiment, the gap 11 is formed between the dust-proof glass plate 23 at the inlet side and the cell 21, in the similar manner to that shown in FIGS. 6 and 7 mentioned above, and further, at the same time, on a surface of the opposed substrate 29 building up the cell 21, there is formed the grooves 32 extending in both the veridical direction and the horizontal direction, in the similar manner to that shown in FIGS. 11 to 13 mentioned above. And, within an inside of the space defined by the gap 11 and the grooves 32 extending in the vertical and horizontal directions, there is enclosed a very small amount of a cooling liquid 110, under the condition of mixing up the gas and the liquid therein.

And, upon a surface defining the space mentioned above, water repellent process is treaded, but except for the portion of the grooves 32, and on the other hand, hydrophilic process is treaded (i.e., surface-active or wetting agent) upon the portion of the grooves 32. In more details, in the water repellent process, a fluorine coating is treated thereon, for example, or in the hydrophilic process is treaded (i.e., surface-active or wetting agent), coating of a thin film of titanium oxide is conducted on the surface of the material thereof. In general, upon the thin film surface of titanium oxide, a liquid is formed into a thin film on the surface of the material, by using energy of a light, even if the liquid adheres thereon. Thus, the liquid adhering thereon cannot make up a liquid drop, but rather is spread over the surface thereof, thereby enabling such the hydrophilic effect.

In addition thereto, with the liquid crystal panel 10 according to the other embodiment, in a part of the attachment frame 22 attached on the outer periphery thereof (i.e., an upper side thereof), as is apparent from the figure, a flow passage 33 is formed, for running a coolant from a cooling module, etc., within an inside thereof, but not shown in the figure, and also in the vicinity of the coolant passage is formed the groove 221 communicating with the gap 11 and the grooves 32 mentioned above.

Next, in the liquid crystal panel 10 according to the above-mentioned other embodiment, the structure of which is shown in FIG. 15 mentioned above, a portion of the gaseous phase of the very little amount of the cooling liquid 110, which is enclosed within the space defined by the gap 11 and the grooves 32, is dispersed or spread over, uniformly within the space mentioned above, but a portion of the liquid phase adheres, but only onto the portion of the grooves 32, due to the hydrophilic processing (i.e., the surface-active or wetting), which is treated upon the surface of the portion corresponding to the grooves 32 mentioned above. And then, the heat upon the heat interruption layer 31 generated due to the incidence of the light 7 from an outside thereupon, and further the heat within the liquid crystal layer 27, which increases the temperature thereof due to absorption of the light therein, propagating through the opposed substrate 29 building up the cells 21 mentioned above, they reach to the surface of the grooves 32, and then they are transferred into the cooling liquid 110 of the liquid phase adhering thereupon.

On the other hand, the cooling liquid 110 of the very small amount adhering upon the surface of the grooves 32, to which the heat is transmitted, is evaporated due to that heat. And, the evaporated cooling liquid 110, directing upwards along the gap 11 and the grooves 32 moves into the groove 221 provided in the attachment frame 22. Therein, that vapor flow 35 is condensed upon the outer wall surface, which defines therein the coolant passage 33 mentioned above, thereby turning back into the liquid in the phase, again. Then, due to this condensation, a liquid drop of the cooling liquid is made up in the vicinity of the coolant passage 33 within the attachment frame 22 mentioned above, and it comes down along the wound outer wall defining the coolant passage therewith, due to the function of the gravity acting thereon, thereby resulting into a flow 34 of the cooling liquid in a lower portion. However, due to the treatment of water repellent process on an inner wall surface of the space defined by the gap 11, the cooling liquid condensed thereon moves downwards along the portion of the grooves 32 within the space mentioned above, but without staying on that inner wall surface, and it swiftly adheres onto the portion of the grooves, on which the hydrophilic process is treaded (i.e., surface-active or wetting), again. Further, with repetition of those mentioned above, there can be build up a circulation cooling system, in the liquid crystal panel device 10. Furthermore, the heat transferred into the coolant within the coolant passage 33 is transferred into an outside of the liquid crystal panel 10, such as, the cooling module mentioned above, etc.

As was mentioned above, with the liquid crystal panel device 10 according to the other embodiment, in the similar manner to that in the liquid crystal panel device according to the embodiment mentioned above, the heat generation on the heat interruption layer 31 within the each cell 21 can be removed therefrom, thereby suppressing an increase of temperature in the liquid crystal layer 27. Namely, with such the heat radiating structure, in the same manner as was mentioned above, it is possible to protect the liquid crystal panel 10 from the local increase of temperature in the cells 21 thereof, thereby elongating the lifetime of the liquid crystal panel. Though the gap defined between the dust-proof glass plate 23 at the inlet side and the cells 21 lies from several μm up to several tens μm in the width, in the structure according to this other embodiment, however, for the cooling liquid 35 of the gaseous phase, it is possible to move easily within such the narrow gap, comparing to the cooling liquid of the liquid phase, and therefore it is possible to remove the local heat generation generated within the cells 21, swiftly. However, with such the structure, the light 7 passes through the portion where the vapor of the cooling liquid goes upwards, but it gives no ill effect upon the picture to be projected therethrough.

Figure 16:
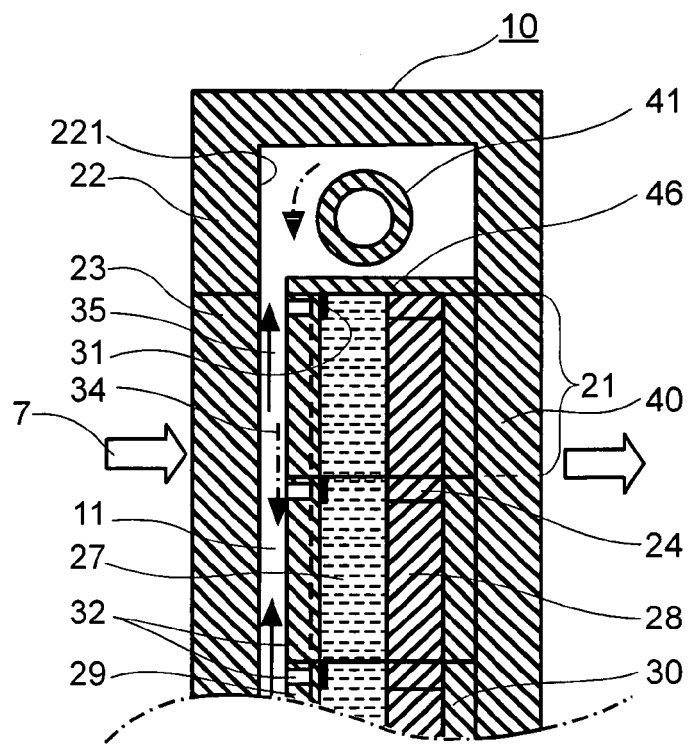
FIG. 16 is a partial enlarged vertical cross-section view for showing the structure of the liquid crystal panel of a first variation, according to other embodiment of the present invention.

Next, FIG. 16 shows a first variation of the liquid crystal panel device 10 according to the other embodiment of the present invention, which was shown in FIG. 15 mentioned above. This FIG. 16 also shows the liquid crystal panel device 10, enlarging the central portion in the horizontal direction and in the vicinity of the upper portion, upon the vertical cross-section thereof, in the similar manner to that shown in FIG. 15 mentioned above. As is apparent from this FIG. 16, with this first variation, differing from the structure shown in FIG. 15 mentioned, above, such the groove 221 as was shown in FIGS. 6, 8, 11, and so on mentioned above, in the attachment frame 22, and within an inside thereof is provided a heat radiation pipe 41 having a circular cross-section thereof.

According to the first variation mentioned above, the liquefied cooling liquid condensed on the surface of the heat radiation pipe 33 falls downwards due to the gravity acting thereupon, but without staying on the surface of that heat radiation pipe 33, within an inside of the groove 221 in the attachment frame 22, and thereafter, in the similar manner to that mentioned above, it moves downwards along the portion of that grooves 32, but without adhering on the inter wall surface of the space, on which the water repellent process is treated, thereby adhering onto the portion of the grooves 32, on the surface of which the hydrophilic process is treaded (i.e., the surface-active or wetting), swiftly. And with such the structure, it is also possible to protect the liquid crystal panel 10 from the local increase of temperature within the cells 21 thereof, thereby elongating the lifetime of the liquid crystal panel, and further, it is also possible to remove the heat generation generated locally within the cells 21, swiftly.

Further, FIG. 17 attached herewith shows a second variation of the liquid crystal panel, according to the other embodiment. This FIG. 17 also shows the liquid crystal panel device 10, enlarging the central portion in the horizontal direction and in the vicinity of the upper portion, upon the vertical cross-section thereof.

With this second variation, differing from the structure shown in FIG. 15 mentioned above, without attaching the heat radiation pipe 33 mentioned above, but in the place thereof, a heat radiation fins 36 are provided on an outside of the attachment frame 22 (i.e., on an upper end surface of the frame 22). With such the structure of the second variation, the cooling liquid 35, which moves into the groove 221 within the attachment frame 22 and is evaporated on an inner surface thereof, is cooled down by the function of the heat radiation fins 36 mentioned above, and it is liquefied on an inside surface of the groove 221 in the attachment frame 22, in particular, on the upper surface thereof; thereafter, it falls down due to the gravity. And, also in this second variation, in the similar manner as was mentioned above, the condensed cooling liquid 34 being liquefied moves downwards along the portion of the grooves 32 mentioned above, but without adhering upon the inner wall surface of the space, on which the water repellent process is treated, and it adheres onto the portion of the grooves 32, on the surface of which the hydrophilic process is treaded (i.e., the surface-active or wetting), swiftly. And with such the structure, it is also possible to protect the liquid crystal panel 10 from the local increase of temperature within the cells 21 thereof; thereby, elongating the lifetime of the liquid crystal panel, and further it is also possible to remove the heat generation generated locally within the cells 21, swiftly. Furthermore, in this figure, an arrow attached with a reference numeral 8 indicates the cooling air.

However, in those embodiments variously mentioned in the above, the explanation was made that, for removing the heat generated on the heat interruption layer 31 within the each cell 21, building up the panel, or for suppressing the increase of temperature in the liquid crystal layer 27, the cooling liquid of the liquid phase, or of both the liquid phase and the gaseous phase, is enclosed within the space, which is defined inside the liquid crystal panel 10; i.e., in the gap 11 between the dust-proof glass plate 23 at the inlet side and the opposed substrate 29 for building up the cells 21, and/or, the grooves 32, which are formed on the surface of the opposed substrate 29 in opposite to the dust-proof glass plate 23 in the vertical direction and/or the horizontal direction. And, the cooling liquid of the liquid phase or of both the liquid phase and the gaseous phase for use of transmitting the heat generation transfer it into an outside of the device through the groove 221 formed within an inside of the attachment frame 22 mentioned above. However, the present invention should not be restricted only to this, but it may be applied into, such the structure shown in FIG. 18 attached herewith, for example, which will be mentioned below.

Figure 18:
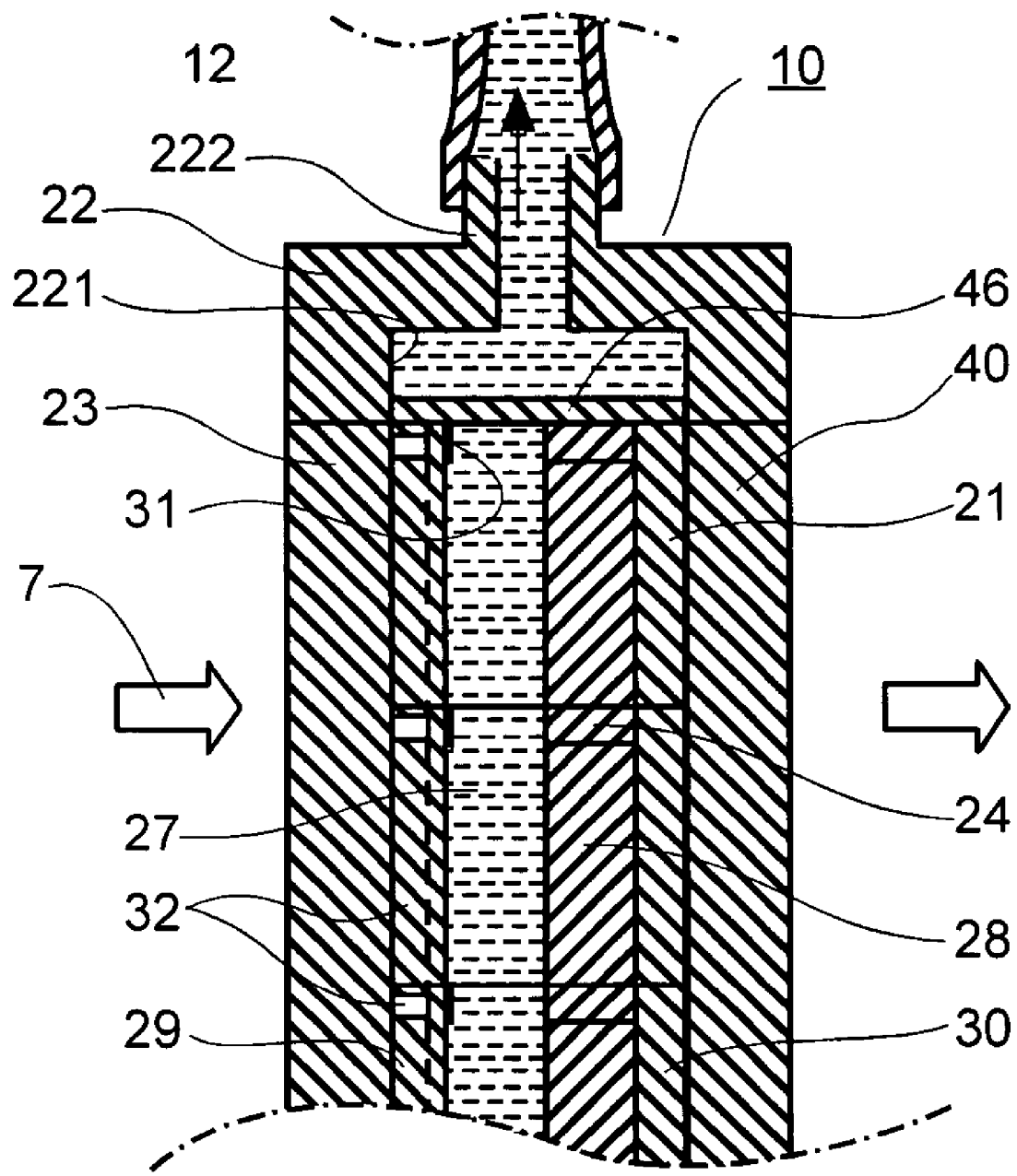
FIG. 18 is a partial enlarged vertical cross-section view for showing the structure of the liquid crystal panel, according to further other embodiment of the present invention.

FIG. 18 shows the liquid crystal panel 10 according to further other embodiment of the present invention. However, this FIG. 18 also shows therein the liquid crystal panel device 10, in the similar manner, i.e., enlarging the central portion in the horizontal direction and in the vicinity of the upper portion, upon the vertical cross-section thereof.

As is apparent from the figure, with the liquid crystal panel 10 according to this further other embodiment, no such gap is formed between the dust-proof glass plate 23 at the inlet side and the opposed substrate 29 building up the cells 21, as was shown in FIG. 11 mentioned above, however on the surface of this opposed substrate 29 in opposite to the dust-proof glass plate 23 are formed the grooves 32 extending vertically and horizontally. And, within an inside of the attachment frame 22 forming the outer frame of the liquid crystal panel device 10, there are formed the groove 221 mentioned above, and further an opening portion 222 formed in a portion thereof. Also, to this opening portion 222 is connected a flexible tube 12.

In this manner, with the liquid crystal panel 10 according to the further other embodiment, with such the structure as was mentioned above, the cooling liquid is taken into an outside of the liquid crystal panel 10 for transmitting the heat generated within the each cell 21 through the opening portion 222 mentioned above, but it differs from that enclosing the cooling liquid into the space to be filled up therein, which is defined in an inside of the liquid crystal panel 10. Thus, the cooling liquid 110 filled up within the space, which is defined inside the liquid crystal panel 10 (i.e., the grooves in the horizontal direction and/or the vertical direction, and/or the gap 11), is carried into an outside from the groove 221 in the attachment frame 22 through the opening portion 222 mentioned above, so as to conduct heat exchange between the atmosphere therein; i.e., building up a compulsive cooling liquid circulation system. Also, with such the structure, it is needles to say, but that the heat generated on the heat interruption layer 31 can be carried or transferred, compulsively, into a place other than within the liquid crystal panel 10, therefore, in the similar manner to that of the embodiment mentioned above, it is also possible to prevent the liquid crystal panel 10 from the local increase of temperature within the cells thereof, and thereby elongating the lifetime of the liquid crystal panel.

Figure 19:
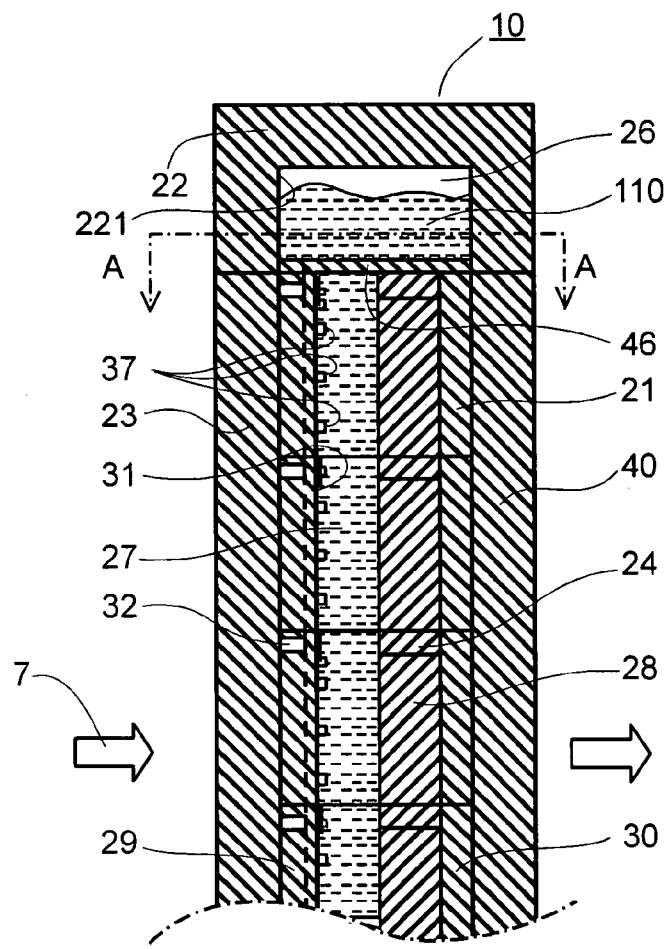
FIG. 19 is also a partial enlarged vertical cross-section view for showing the structure of the liquid crystal panel, according to further other embodiment of the present invention.
Figure 20:
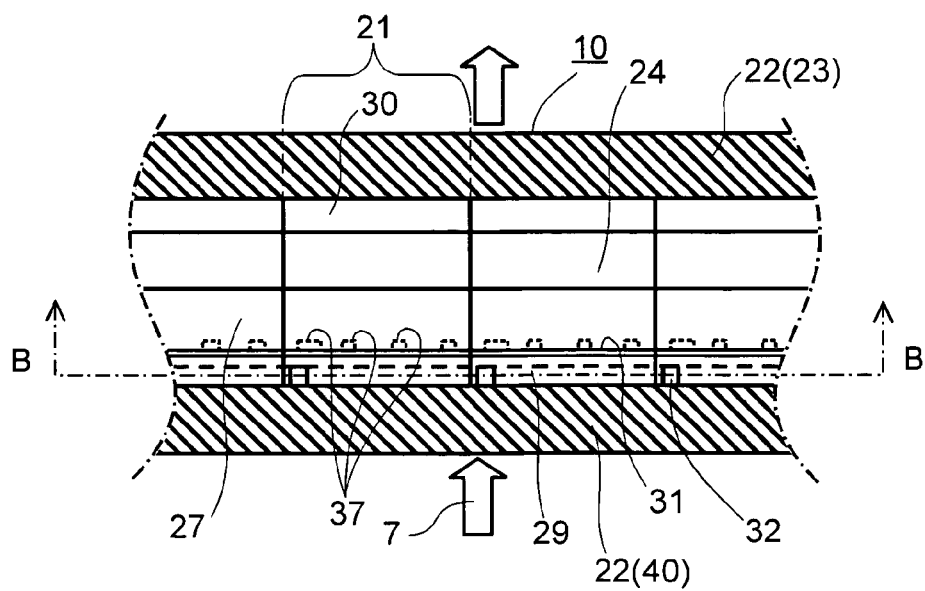
FIG. 20 is an A—A cross-section view of FIG. 19 mentioned above, for showing the structure of the liquid crystal panel, according to the further other embodiment of the present invention mentioned above.
Figure 21:
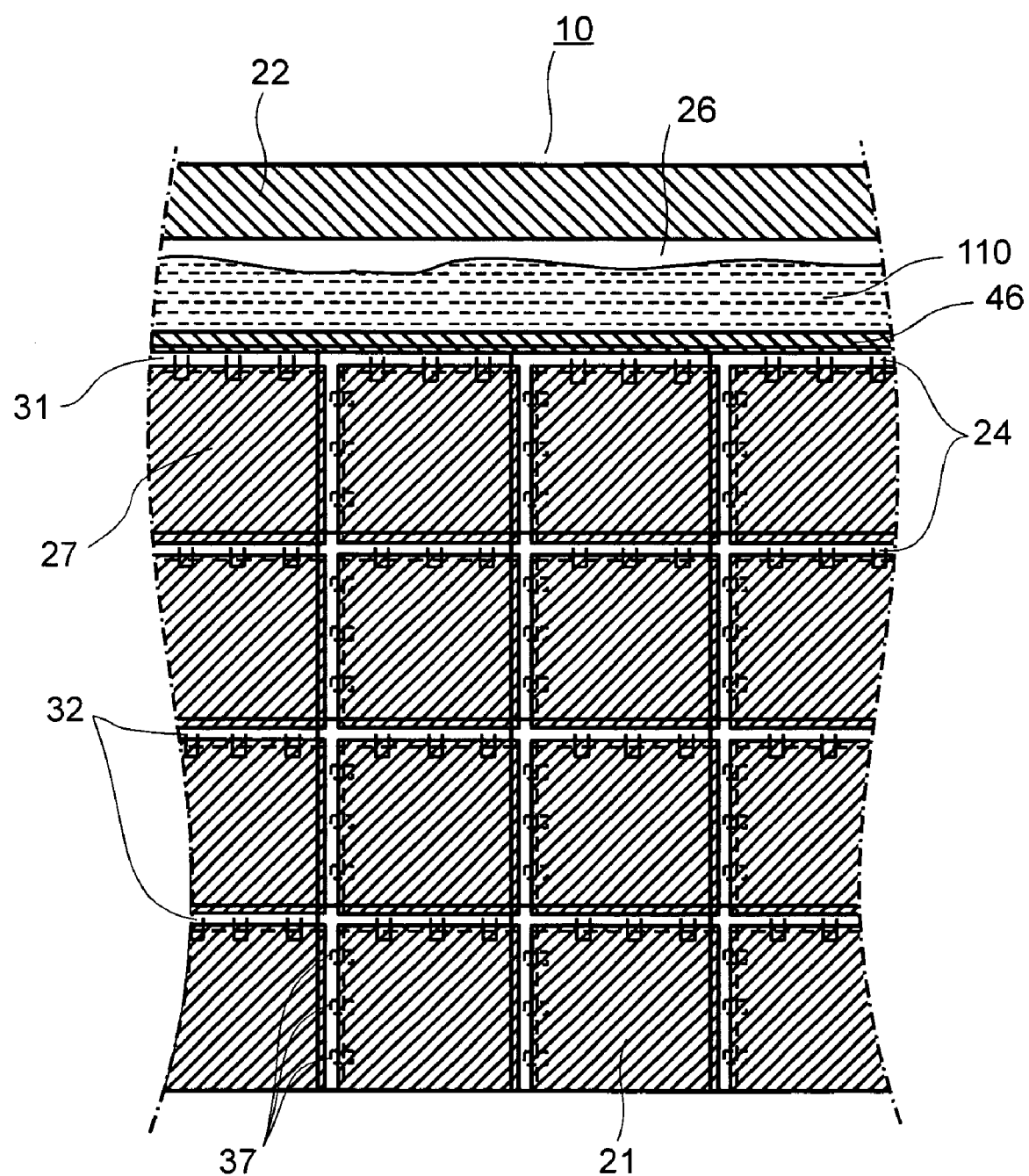
FIG. 21 is an B—B cross-section view of FIG. 20 mentioned above, for showing the structure of the liquid crystal panel, according to the further other embodiment of the present invention mentioned above.

FIGS. 19 to 21 show therein the liquid crystal panel 10 according to further other embodiment of the present invention. However, those FIGS. 19 to 21 also show the liquid crystal panel device 10, in the similar manner; i.e., enlarging the central portion in the horizontal direction and in the vicinity of the upper portion, on the vertical cross-section thereof, and the A—A cross-section and the B—B cross-section thereof, respectively.

However, with such the liquid crystal panel 10 shown in those figures, in the similar manner to that shown in FIGS. 11 to 13 mentioned above; i.e., the grooves 32 are formed on the surface of the opposed substrate 29, which builds up the cells 21, in opposite to the dust-proof glass plate 23 at the inlet side, extending in the horizontal direction and the vertical direction thereof, for enclosing the cooling liquid 110 within an inside thereof, and further on the surface of the opposed substrate 20 in opposite to the liquid crystal layer, there are formed thermo-electric elements 37 in plural numbers thereof.

Figure 22:
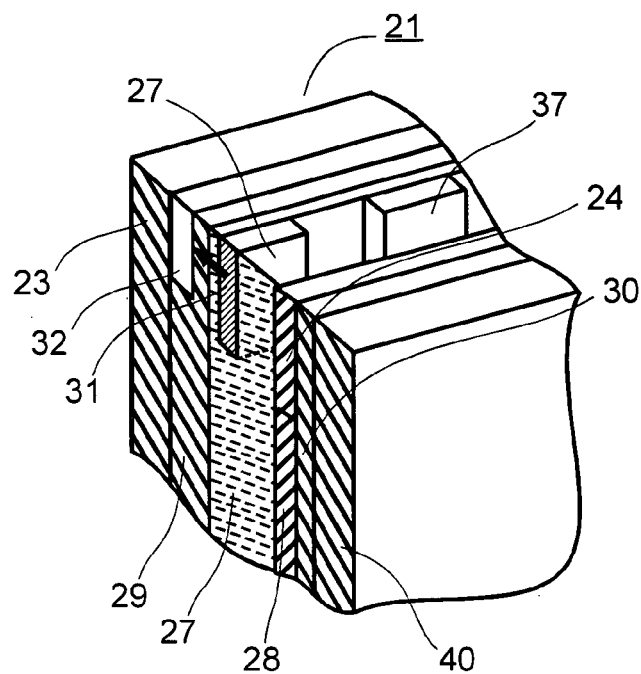
FIG. 22 is a partial enlarged perspective view, including a cross-section view thereof, for showing the structure of a cell in the liquid crystal panel, according to the further other embodiment of the present invention mentioned above.

Also, FIG. 22 attached herewith is an enlarged perspective view, including in a part the side surface cross-section thereof, for showing a portion of the cell 21, cutting out only one (1) piece thereof from the liquid crystal 10 according to the further other embodiment of the present invention, and also enlarging it, shown in FIGS. 19 to 21 mentioned above. As is apparent from those figures, each of the thermo-electric elements 37 is attached within the each cell 21, so that it connects both between the heat interruption layer 31 and the liquid crystal layer 27.

And, with such the structure of the liquid crystal panel 10, according to the further other embodiment of the present invention mentioned above, the incident light 7 upon the panel passes through each portions of the device, in the similar manner as was mentioned above, and a part thereof is changed into the heat upon being interrupted on the heat interruption layer 31. Also, the lights other than that are also changed into the heat in the liquid crystal layer 27, but depending upon the cases. Then, as indicated by an arrow in FIG. 22, due to the function of the thermo-electric elements 37 mentioned above, the heat that is changed from the light is be transferred, aggressively, directing to the opposed substrate 29 mentioned above from the liquid crystal layer 27 through the heat interruption layer 31, i.e., towards the cooling liquid filled up within the grooves 32, which are formed on the surface thereof in opposite to the dust-proof glass plate 23 at the inlet side. With this, the heat generated due to the light interrupted upon the heat interruption layer 31 is prevented from moving or transferring into the side of the liquid crystal layer 27, therefore it never heats up the liquid crystal within the liquid crystal layer 27. Further, the heat in the liquid crystal of high temperature, since absorbing apart of the light penetrating through within the liquid crystal layer 27, also can be transferred directing to the cooling liquid within the grooves 32, which are formed on the surface of the opposed substrate in opposite to the dust-proof glass plate 23 at the inlet side, due to the function of the thermo-electric element 37.

In this manner, with such the structure of the liquid crystal panel 10, according to the further other embodiment of the present invention mentioned above, due to the function of the above-mentioned thermo-electric elements 37, it is possible to move or transfer the heat into an outside thereof, which is generated within each of the cells building up the liquid crystal panel, with using the cooling liquid filled up within the grooves 32 of the cell, effectively much more; thereby, protecting it from the local increase of temperature within the cell, with much certainty. With doing so, it can achieves the effects of obtaining an improvement in the reliability thereof, as well as, elongating the lifetime of the liquid crystal panel, in the similar manner to the structures according to the various embodiments mentioned above.

Figure 23:
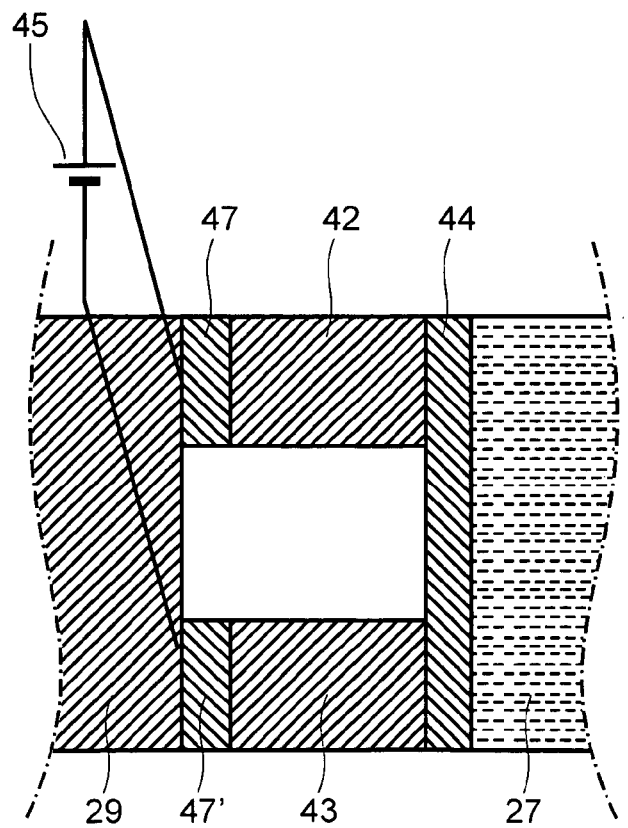
FIG. 23 is a partial enlarged cross-section view, for showing the structure of the cell in the liquid crystal panel, according to the further other embodiment of the present invention mentioned above.

Also, FIG. 23 attached herewith shows the structure of the liquid crystal panel 10, according to the further other embodiment mentioned above, being built up with the cells, in which thermo-electric element is applied therein each; in more details thereof, the Pertier element is applied therein. However, this FIG. 23 is the cross-section view for showing only a portion of one (1) piece of the cell 21, cutting out from the liquid crystal panel 10, while enlarging it, and it shows only a peripheral portion of the thermo-electric element, in particular.

Thus, in this FIG. 23, reference numerals 42 and 43 in the figure depict an n-type semiconductor layer and a p-type semiconductor layer building up the Pertier element, respectively, and a reference numeral 44 depicts a metal layer for forming a junction covering over those n-type semiconductor and the n-type semiconductor. Also, a reference numeral 45 in the figure indicates an DC electric power source, and this DC electric power source is connected to the n-type semiconductor layer 42 and the p-type semiconductor layer 43, electrically, through electrode layers 47 and 47', which are formed on the surfaces in opposite to that where the metal layer 44 is formed thereon, respectively. Further, differing from the structure mentioned in the above, herein is shown an example, in which no such the heat interruption layer 31 is formed on the surface of the opposed substrate 29 fronting or facing the liquid crystal layer 27, but in the place thereof is formed the thermo-electric element mentioned above.

Because of the function of the thermo-electric element 37 that is built up with the Pertier element; i.e., by supplying the DC current of the DC power source 45 directing from the n-type semiconductor layer 42 to the p-type semiconductor layer 43, the heat is moved or transferred in the direction opposite to that of the current flowing therein, in particular, in the n-type semiconductor layer 42, on the other hand, in the p-type semiconductor layer 43, the heat is moved or transferred in the same direction to that of the current flowing therein (see arrows in the figure). With this, i.e., through supplying the current directing into the thermo-electric element 37, there can be achieved the functions of preventing the heat generated on the heat interruption layer 31 within the cell 21 from moving or propagating into the side of the liquid crystal layer 27, and also of removing the heat from the liquid crystal layer 27, so as to control the temperature thereof to be low.

Figure 24:
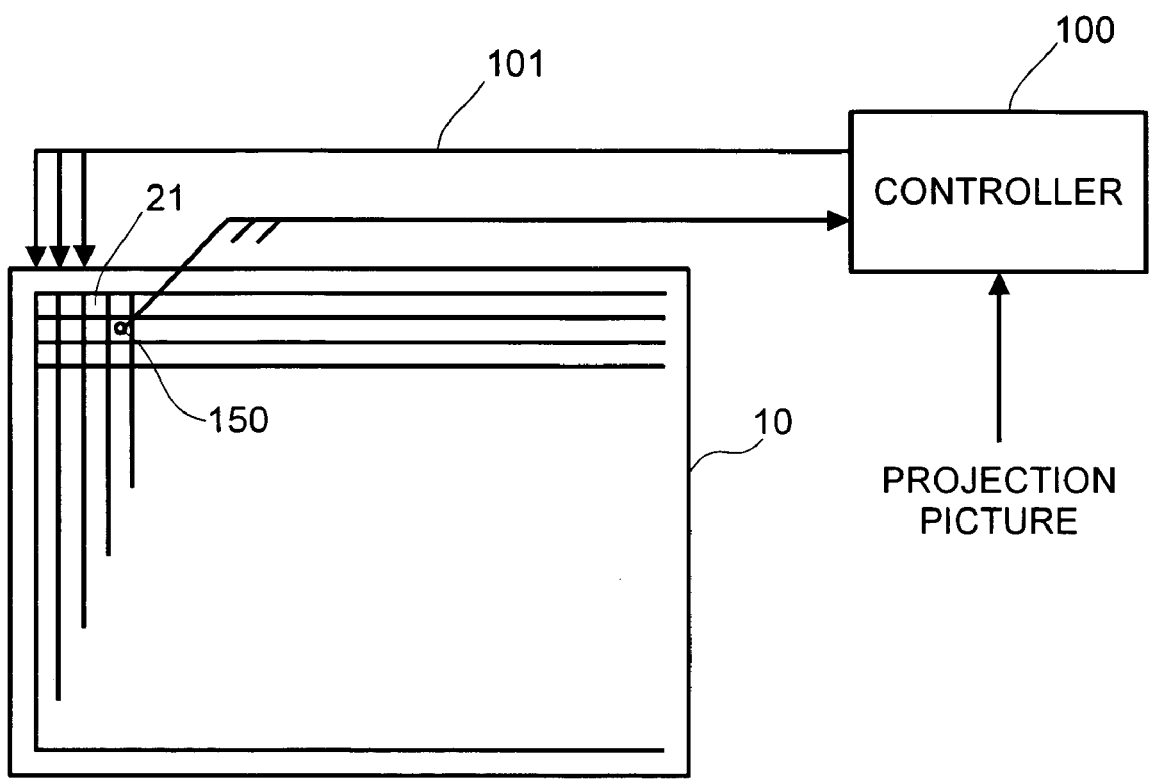
FIG. 24 is a block diagram for showing an example of a control on the liquid crystal panel, according to the further other embodiment of the present invention mentioned above.

Further, FIG. 24 attached herewith shows an example of the circuit structure, for driving/controlling the thermo-electric element 37 mentioned above, in particular, in the liquid crystal panel 10 according to the further other embodiment shown in FIGS. 19 to 23 above. Namely, a controller 100 having a DC electric power source and a driver circuit, etc., within an inside thereof, is connected to the thermo-electric element 37 through a wire 101, which is connected to an electrode of the Pertier element, being provided within each of the large numbers of sells 21 building up the liquid crystal panel 10. Also, this controller 100 comprises therein a calculation means; such as, a microcomputer, etc. And, it is so constructed that, for example, while inputting the information of the picture to be projected, from video signals inputted therein, it picks up a portion corresponding to a dark display portion on the projection picture (for example, a portion displaying a black color), in particular, so as to supply DC current for driving the thermo-electric element 37, for the cell corresponding to that portion. Or alternatively, as shown by a reference numeral 150 in the figure, it is also possible to form a thermo-sensor (such as, a thermistor, for example) as a unit within each of the cells 21 building up the liquid crystal panel 10, and the detection signal thereof is taken into the controller 100, so that selection is made upon a cell to be supplied with the DC current with using that detection signal.

Further, in the example mentioned above, the explanation was made that, the spaces defined within the large numbers of cells 21 building up the liquid crystal panel 10, to be filled up with the cooling liquid in the inside thereof, as shown in FIGS. 11 to 13 mentioned above, they are defined by the grooves 32, which are formed on the surface of the opposed substrate 29 in opposite to the dust-proof glass plate 23, horizontally and vertically. However, the present invention should not be restricted only to such; therefore, the space defined for circulating the cooling liquid within an inside thereof may be built up, other than that, for example, by the gap 11 defined between the opposed substrate 29 and the dust-proof glass plate 23, as shown in FIGS. 6 and 7 mentioned above, or alternatively, as shown in FIGS. 8 to 10 mentioned above, by only the grooves 32 formed in the vertical direction. Further, by combining those; thus, the spaces may be defined by the grooves 11 and the grooves 32. Moreover, the cooling liquid to be filled up within that space may be enclosed therein by a very small amount, so that it lies within the inside thereof under the condition of mixing the liquid phase and the gaseous phase thereof, as the embodiment shown in FIGS. 15 to 17 mentioned above, and further, such the stricture may also be adopted as shown in FIG. 18 mentioned above, i.e., the cooling liquid can be taken out from the device.

Figure 25:
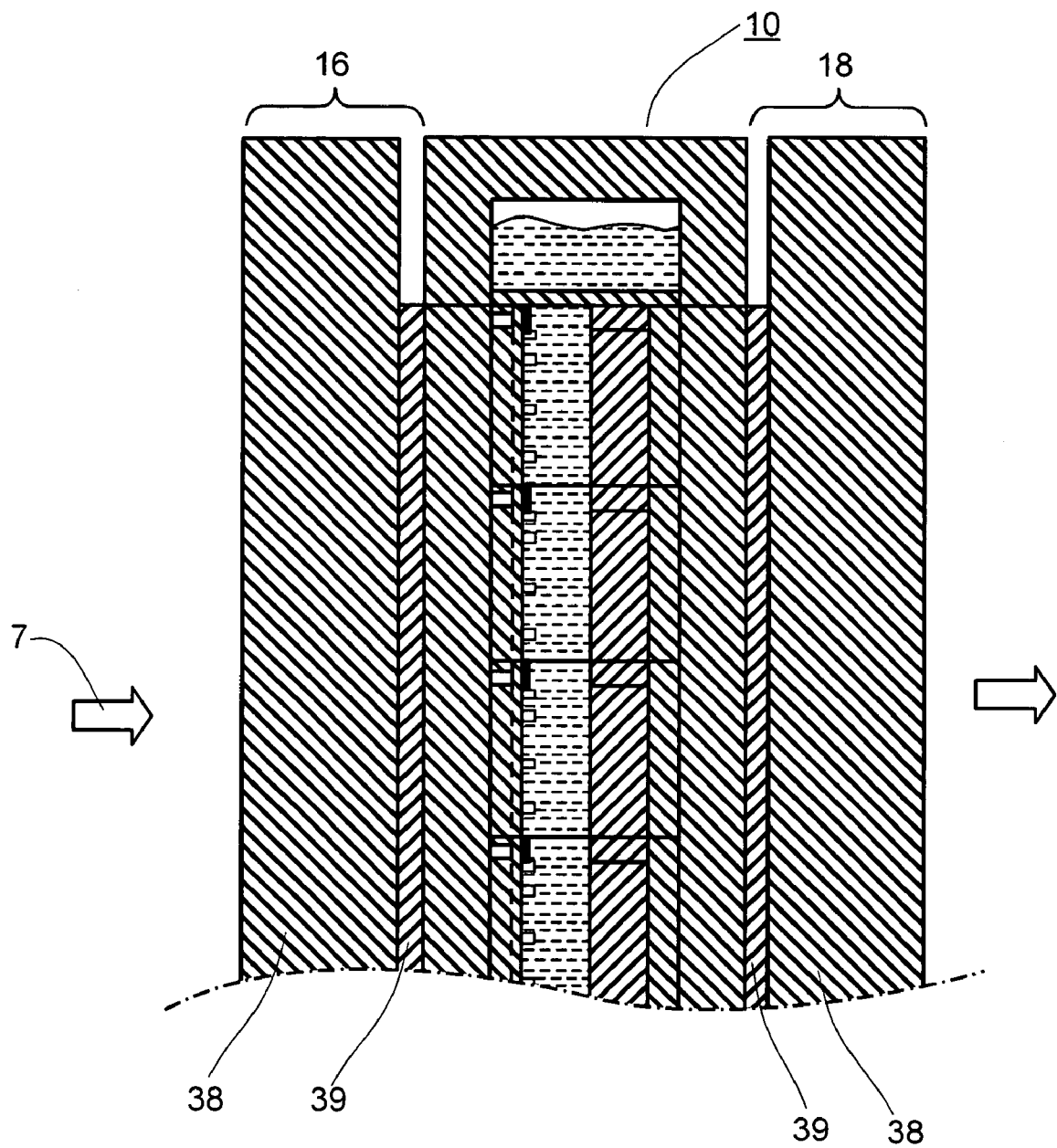
FIG. 25 is a partial enlarged cross-section view for showing the structure, in which the liquid crystal panel according to the further other embodiment of the present invention is applied into the liquid crystal projection mentioned above as the liquid crystal panel thereof.

Finally, FIG. 25 attached herewith shows the liquid crystal panel 10, according to the further other embodiment shown in FIGS. 19 to 23 mentioned above, but in an actual structure when being applied into, as a liquid crystal panel 10 for building up the panel portion 3 of the liquid crystal projector (see FIG. 1 mentioned above). Namely, as is apparent from the figure, in the actual liquid crystal projector, the liquid crystal panel 10 mentioned above is applied therein, further by attaching the polarizing plate 16 at the light inlet side and the polarizing plate 18 at the light exit side upon the front and rear surfaces thereof. Further, in actual, both the polarizing plate 16 at the light inlet side and the polarizing plate 18 at the light exit side are made up, each by attaching a polarizing sheet 39 on a glass plate 38. And herein, as shown in the figure, in the structure thereof, those two (2) pieces of the glass sheets 38 are disposed in opposite to each other while directing the polarizing sheets 39 attached on the surfaces thereof into the inside thereof, and the liquid crystal panel 10 is inserted between them in contact therewith upon the surfaces thereof.

This is due to the fact that, within the structure of the liquid crystal panel in the actual liquid crystal projector mentioned above, the places of generating the heat lie on the polarizing sheets 39, which build up the polarizing plate 16 at the light-inlet side and the polarizing plate 18 at the light-exit side, respectively. Namely, attaching the polarizing sheet 39 on the dust-proof glass plate 23 of the liquid crystal panel 10 in contact therewith, in this manner, also enables removal of the heat generated from the polarizing sheet 39 into an outside, due to the function of the thermo-electric element 37 provided within the liquid crystal panel 10 mentioned above. Accordingly, it is possible to make the distance between the liquid crystal panel 10, the polarizing plate 16 located at the light inlet side and the polarizing plate 18 located at the light-exit side, being narrow at the most. With this, since it is possible to suppress the heat generation upon the polarizing plate 16 at the light-inlet side and the polarizing plate 18 of the light-exit side, which are disposed in the front and the rear thereof, therefore it eliminate the necessity of provision of such the cooling device as was mentioned above in relation to the conventional art; i.e., it is possible to build up the liquid crystal projector to be compact, much more.

However, in the above explanation made, although only the example was mentioned in details thereof, in which the liquid crystal panel device is applied into the liquid crystal projector, but, the present invention should not be restricted only to that; i.e., other than that, the liquid crystal panel according to the present invention may also be applied into, such as, the display of a personal computer, and the display of a thin-type television apparatus, for example. Further, it may be applied into the display of a digital camera, and also the display of a video apparatus, etc., and further, it is also applicable into one having the display in a part thereof, in which a light generation source is provided in the rear thereof, in particular. Also, the present invention is effective for the liquid crystal device, which is made up with the liquid crystal device of being so-called the "TFT" type, in particular.

As was mentioned in details in the above, with such the various embodiments according to the present invention as mentioned above, the following effects can be obtained:

(1) With provision of the gap between the dust-proof glass plate at the upstream side of the incident light and the opposed substrate within the liquid crystal panel, to be filled up with the cooling liquid therein, the heat generated in the liquid crystal panel can be transmitted into the cooling liquid, effectively, and also, due to the free or natural convection of the cooling liquid, it is possible to radiate or discharge that heat into an outside from the attachment portion of the liquid crystal panel.

(2) With the structure of building up the heat interruption layers at the upstream side of the incident light upon the surface of the opposed substrate, corresponding to the semiconductor portions of the cells (i.e., the pixels), and also, provision of the grooves on the opposite side surface of the opposed substrate, corresponding to the heat interruption layers, as well, to be filled up with the cooling liquid therein, it is possible to transmit the heat from the heat interruption layer, as the heat source of the liquid crystal panel, into the cooling liquid, effectively, and also, due to the free or natural convection of the cooling liquid, it is possible to radiate or discharge that heat from the attachment portion of the liquid crystal panel.

(3) With the structure of providing the gap between the dust-proof glass plate at the upstream side of the incident light and the opposed substrate within the liquid crystal panel, and/or providing the grooves on the opposite side surface of the opposed substrate corresponding to heat interruption layers, which are formed corresponding to the semiconductor portions of the cells (i.e., the pixels), and further, with treating the hydrophilic (surface-active or wet-surface) process only upon the grooves while treating water-repellent process upon the remaining portions of the gap, so as to enclose a very small amount of the cooling liquid within an inside of the gap and the grooves, under the condition of mixing the gaseous phase and the liquid phase thereof, it is possible to remove the heat from the heat interruption layer, as the heat source of the liquid crystal panel, due to the evaporation of the cooling liquid in the gap. Further, evaporated vapor of the cooling liquid moves to the upper portion of the attachment frame; therefore, it is possible to transfer that heat into an outside thereof, through the heat radiation pipe formed therein and the heat radiation fins, etc. Further, the cooling liquid, which is condensed and/or liquefied within the attachment frame, flows back within the grooves due to the hydrophilic treatment thereupon, thereafter, thereby enabling to build up a circulating cooling system.

(4) In addition to the gap and the grooves mentioned above, providing the thermo-electric elements on the surface of the opposed substrate in opposite to the liquid crystal layer, along the heat interruption layers, enables to obtain the heat transfer of much effective, thereby controlling the temperature of the liquid crystal panel to be low, and achieving high reliability and also cooling of high efficiency.

(5) Furthermore, also with attaching the polarizing plates on the liquid crystal panel device in one body, it is possible to control the temperature, including that of the polarizing plates therein, in particular, thereby enabling to achieve a compact structure of the panel portion within the liquid crystal projector.

Moreover, according to the present invention mentioned above, there can be achieved the superior effects: of enabling to protect the liquid crystal panel from the local increase of temperature within the large numbers of cells building up thereof, effectively, and thereby elongating the lifetime of the liquid crystal panel, as well as, enhancing the reliability thereof.

Also, according to the present invention mentioned above, in particular, the cooling liquid being enclosed therein, under the condition of mixing the gaseous phase and the liquid phase thereof, further enables swift cooling, in addition to the effects mentioned above.

Further, according to the present invention mentioned above, building up the thermo-electric elements within the liquid crystal panel device enables each of the cells building up the panel to transfer the heat generation in the each cell into an outside thereof, aggressively and effectively much more. And, in addition to the effects mentioned above, there can be obtain the superior effect of enabling the temperature control thereof, in particular, including the heat generation in the polarizing plates attached on both side surfaces thereof.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A liquid crystal panel device, comprising:
 a substrate formed with semiconductor portions and pattern layers in plural numbers on a surface thereof;
 an opposed substrate disposed in opposite to said substrate upon a surface thereof, on which the semiconductor portions and the pattern layers are formed; and
 a layer of liquid crystal enclosed between said substrate and said opposed substrate, whereby forming liquid crystal cells in plural number within an inside thereof, further comprising:
 a heat interruption layer being formed on a surface of said opposed substrate in opposite to said liquid crystal layer, corresponding to the semiconductor portions formed on said substrate;
 a transparent plate being provided in opposite to said opposed substrate, at an upstream side of an optical path of an incident light upon said device; and further
 a space for receiving a cooling medium within an inside thereof, upon a surface of said opposed substrate, being opposite to the side on which said heat interruption layer is formed, and in vicinity of said heat interruption layer;

wherein said cooling medium is received within grooves formed on a surface of said opposed substrate, facing to said transparent plate disposed in opposition thereto, at the upstream side of the optical path of the incident light; and wherein said grooves are formed vertically or/and horizontally along with said heat interruption layers, on the surface of said opposed substrate.

2. The liquid crystal panel device, as described in the claim 1, wherein said cooling medium is a liquid.

3. The liquid crystal panel device, as described in the claim 1, wherein said cooling medium is a mixture of liquid and gas in phases thereof.

4. The liquid crystal panel device, as described in the claim 1, wherein said cooling medium is hermetically enclosed within said receiving space.

5. The liquid crystal panel device, as described in the claim 1, wherein said cooling medium is guided from said receiving space into an outside of said device.

6. The liquid crystal panel device, as described in the claim 1, wherein hydrophilic process is treated on a surface of a portion near to said heat interruption layer, within said space for receiving the cooling medium therein, while a water-repellent process is treated on remaining portions thereof.

7. The liquid crystal panel device, as described in the claim 1, wherein said cooling medium is received within an inside of the gap defined between said opposed substrate and said transparent plate provided in opposition thereto, at the upstream side of the optical path of the incident light.

8. The liquid crystal panel device, as described in the claim 1, wherein said substrate, said opposed substrate, said liquid crystal layer hermetically enclosed between said substrate and said opposed substrate, and said transparent plate are covered with a frame on an outer periphery thereof, and a groove is formed in an inside of at least an upper side of said frame, connecting with said space.

9. The liquid crystal panel device, as described in the claim 8, wherein an opening portion is formed in a part of said frame, within which the groove is formed, for the cooling medium to flow within.

10. The liquid crystal panel device, as described in the claim 8, wherein a heat radiation fin(s) is/are formed in a part of said frame within which the groove is formed.

11. The liquid crystal panel device, as described in the claim 1, wherein further thermo-electric elements are formed on the surface of said opposed substrate, on which said heat interruption layer is formed.

12. The liquid crystal panel device, as described in the claim 11, wherein said thermo-electric elements are disposed along with said heat interruption layers.

13. The liquid crystal panel device, as described in the claim 1, further being applied as a liquid crystal panel for use in a liquid crystal projector.

14. The liquid crystal panel device, as described in the claim 13, wherein polarizing plates are attached on both a front surface and a rear of said device, respectively.

15. The liquid crystal panel device, as described in the claim 1, further being applied as a display for use in a personal computer.

16. The liquid crystal panel device, as described in the claim 1, further being applied as a display for use in a television apparatus.

* * * * *